United States Patent [19]
Kern

[11] Patent Number: 6,081,104
[45] Date of Patent: Jun. 27, 2000

[54] METHOD AND APPARATUS FOR PROVIDING ENERGY TO A LIGHTING SYSTEM

[75] Inventor: Gregory A. Kern, Louisville, Colo.

[73] Assignee: Applied Power Corporation, Lacey, Wash.

[21] Appl. No.: 09/197,276

[22] Filed: Nov. 20, 1998

[51] Int. Cl.[7] .................................................... G05F 1/40
[52] U.S. Cl. .................... 323/268; 323/906; 320/101; 363/97
[58] Field of Search ...................... 323/268, 271, 323/906; 320/101, 141, 163; 363/97, 142

[56] References Cited

U.S. PATENT DOCUMENTS

| | | | |
|---|---|---|---|
| 3,384,806 | 5/1968 | Hartman | 322/2 |
| 3,489,915 | 1/1970 | Englehardt | 307/66 |
| 3,609,502 | 9/1971 | Burkett et al. | 320/5 |
| 4,375,662 | 3/1983 | Baker | 363/95 |
| 4,390,940 | 6/1983 | Corbefin et al. | 363/132 |
| 4,404,472 | 9/1983 | Steigerwald | 307/46 |
| 4,445,049 | 4/1984 | Steigerwald | 307/45 |
| 4,468,569 | 8/1984 | Norris | 290/1 |
| 4,636,931 | 1/1987 | Takahashi et al. | 363/71 |
| 4,638,236 | 1/1987 | Carr et al. | 320/21 |
| 4,649,334 | 3/1987 | Nakajima | 323/299 |
| 4,695,785 | 9/1987 | Mieth et al. | 323/222 |
| 4,742,291 | 5/1988 | Bobier et al. | 320/101 |
| 4,847,546 | 7/1989 | Bobier et al. | 320/21 |
| 4,873,480 | 10/1989 | Lafferty | 323/229 |
| 4,916,382 | 4/1990 | Kent | 323/299 |
| 5,151,865 | 9/1992 | Blessing et al. | 364/483 |
| 5,291,388 | 3/1994 | Heinrich | 363/98 |
| 5,327,066 | 7/1994 | Smith | 320/2 |
| 5,477,132 | 12/1995 | Canter et al. | 323/282 |
| 5,659,465 | 8/1997 | Flack et al. | 363/71 |

*Primary Examiner*—Shawn Riley
*Attorney, Agent, or Firm*—Chrisman, Bynum & Johnson

[57] ABSTRACT

A system for delivering power to a battery and to a load includes a power source that supplies energy to the battery and the load. The battery can be charged by the power source and used to supply energy or power to the load when the power source is unable to provide sufficient energy and power to the load. The system reduces injection of DC current into the load and, as a result, extends the operation life of the load, particularly if the load is an AC lighting or lamp system. The system operates the load in an optimal manner such that battery storage is maintained at near full charge, yet the lighting load operates for a maximum number of hours per night. The benefit of the system is to prevent early failure of either the lighting load or the battery.

67 Claims, 11 Drawing Sheets

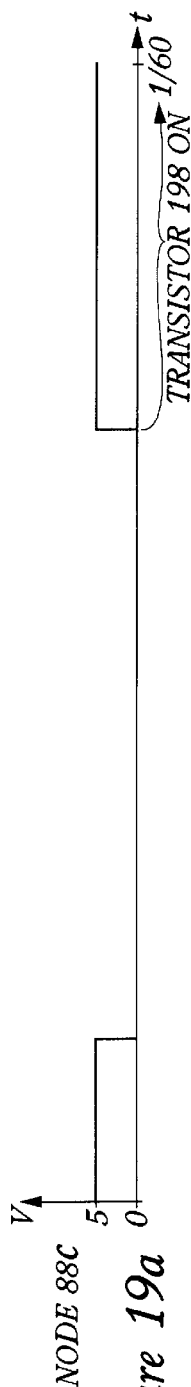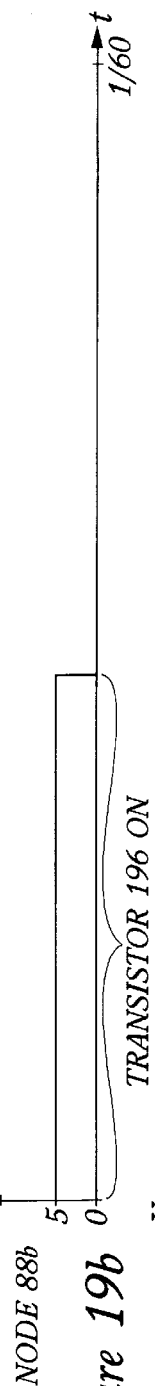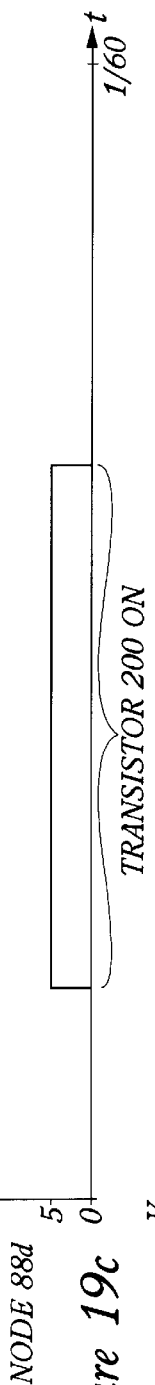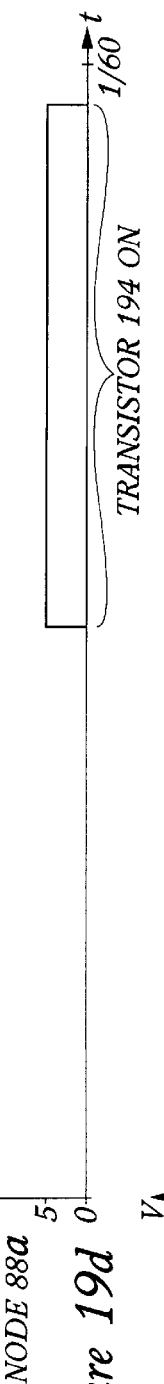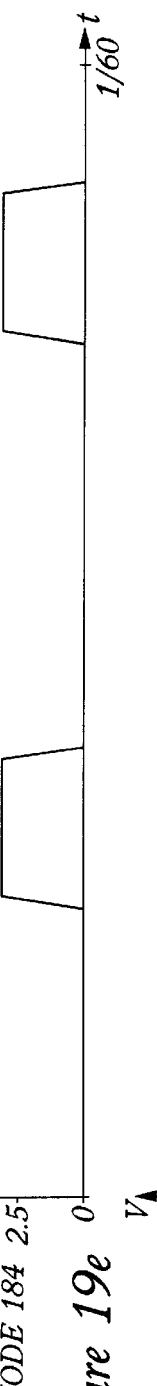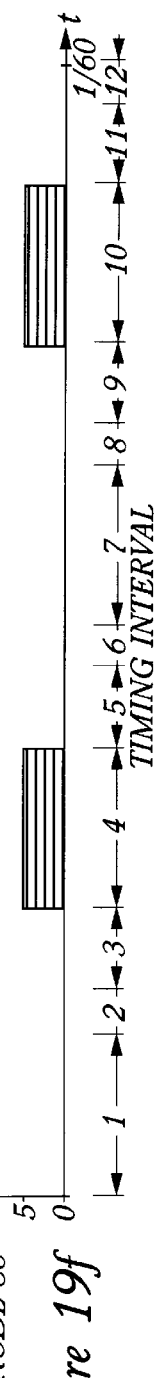

METHOD AND APPARATUS FOR PROVIDING ENERGY TO A LIGHTING SYSTEM

ACKNOWLEDGMENT OF GOVERNMENT SUPPORT

The United States Government has rights in this invention under Contract No. BD-005B between Sandia National Laboratories and Ascension Technology, Inc.

BACKGROUND OF THE INVENTION

1. Field of the Invention

The present invention relates generally to an apparatus and method for charging a power source and, more specifically, to an apparatus and method for simultaneously or sequentially charging a power source and providing electric energy to a lighting or lamp system.

2. Description of the Prior Art

In recent years, the use of solar energy and wind energy has become an increasingly important source of energy and the availability and efficiency of photovoltaic cells and photovoltaic arrays, which convert solar energy into electrical energy, has steadily increased. The power generating capabilities of photovoltaic cells and photovoltaic arrays rely heavily on ambient conditions. In particular, the amount of solar radiation incident on the photovoltaic cells and photovoltaic arrays, which varies as a function of weather, clouds, time of year, and other meteorologic conditions, and the ambient temperature affect the amount of electrical energy that can be generated by the photovoltaic cells or photovoltaic arrays.

In a typical and common application of a photovoltaic array, the photovoltaic array is used to supply electric energy and electric power directly to a load. While this configuration is adequate for daylight operation, the photovoltaic array may cease to provide electric energy and electric power during periods of darkness or periods of reduced incident solar radiation. Similarly, a wind turbine may not generate energy during periods of little or no wind. Therefore, many photovoltaic array or wind turbine configurations include a battery that is charged by the photovoltaic array or the wind turbine during periods of incident solar radiation or sufficient wind. The energy stored in the battery can then be used to supply electric energy and electric power to a load during periods of darkness or periods of reduced incident solar radiation or wind. This in turn causes the battery to discharge. With this type of configuration, therefore, the photovoltaic array or the wind turbine and the battery act together to keep the load supplied with electric energy and electric power and the battery is alternately charged and discharged.

For a given temperature of the photovoltaic cell or photovoltaic array and a given amount of solar radiation incident on the photovoltaic cell or photovoltaic array, there is a curve relating the voltage across the photovoltaic cell or photovoltaic array with electric current flowing through the photovoltaic cell or photovoltaic array. Thus, there is a family of voltage/current curves for a given photovoltaic cell or photovoltaic array and varying weather conditions can create variations in the amount of electric power generated by the photovoltaic cells and photovoltaic arrays. The amount of power available from a wind turbine varies with the wind speed. In addition, ambient conditions may affect the operation and capacity of the battery.

In order to most efficiently use the electric energy and power generated by a photovoltaic cell or photovoltaic array, it is desirable to maximize the power generated by the photovoltaic cell or photovoltaic array, despite varying weather conditions. Maximizing the power generated by a photovoltaic cell or photovoltaic array requires the determination of the optimal operating conditions for the photovoltaic cell or photovoltaic array for the given weather conditions, i.e., it is necessary to find the operating point on the voltage-versus-current curve for the photovoltaic cell or photovoltaic array that maximizes the power output from the photovoltaic cell or photovoltaic array. Furthermore, a generator system incorporating a photovoltaic cell or photovoltaic array preferably is able to determine optimal operating parameters for the generator system for varying temperatures and varying amounts of solar radiation incident on the photovoltaic cell or photovoltaic array.

In addition to the problems discussed above, when a generator system is used to provide electric energy to a lighting or lamp system, additional precautions are necessary to ensure proper and continued operation of the lighting system. For example, AC lighting lamps are prone to premature failure if some amount of DC current is injected into them during operation. This problem is particularly pervasive in lighting systems using high pressure sodium, a form of high intensity discharge (HID) lamp. Fixtures, ballasts, and lamps are widely available to be powered from AC power sources. The design of a DC ballast to run an HID lamp is difficult because of the need for a high voltage starting circuit, and each DC ballast design may only be used to power one lamp type and size, requiring a family of DC ballasts to power a family of lamp types and sizes. Therefore, the generator system preferably prevents DC current from becoming a part of the input signal to the lighting system. In addition, storage batteries used in lighting systems are often not properly protected against excessive deep discharge. As a result, if the storage batteries operate for a long period of time at a low state of charge, or if the storage batteries are frequently excessively discharged, the storage batteries will often prematurely fail and, at the very least, will not maintain their peak storage capacity.

Consequently, in spite of the well-developed state of battery charging, there is still a need for relatively simple and low cost system for supplying energy and power to a battery and to a load, particularly where the load is a lighting or lamp system.

SUMMARY OF THE INVENTION

Accordingly, it is an object of the present invention to provide an apparatus and method for charging a chargeable power source.

Another object of the present invention is to provide an apparatus and method for providing electric energy or power to a load while simultaneously or sequentially charging a chargeable power source.

Still another object of the present invention is to provide a method for prevention of prolonged operation of storage batteries at low state of charge in renewable powered lighting systems.

Still another object of the present invention is to provide an apparatus and method for supplying energy and power to a lighting or lamp system.

A further object of the present invention is to provide an apparatus and method for delivering energy and power from a photovoltaic cell or photovoltaic array or wind turbine to a battery in order to charge the battery.

Yet another object of the present invention is to provide an apparatus and method for providing energy to a load from a chargeable energy source that allows for daily or seasonal variations in load operation requirements.

Another object of the present invention is to provide an apparatus and method for providing energy to a load from a chargeable energy source that allows for daily or seasonal variations in supply of energy to charge the chargeable energy source.

A still further object of the present invention is to provide a power system suitable for use with AC lighting lamps such as high intensity discharge lamps.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, an apparatus for supplying energy to a load includes an energy source; an energy storage device coupled to said energy source via a first energy converter; a second energy converter coupled to said energy storage device; and an energy inverter coupled to said second energy converter and the load.

Also to achieve the foregoing and other objects and in accordance with the purposes of the present invention, as embodied and broadly described herein, a method for delivering energy to a load includes charging a chargeable energy storage source; boosting a first voltage signal from said chargeable energy storage source to or above a first voltage level; converting said first voltage signal to a second voltage signal having a second voltage level; and supplying said second voltage signal to the load.

In another embodiment of a method in accordance with the present invention, a method of delivering energy to a chargeable energy source and a load includes converting energy received from an energy source into energy receivable by the chargeable energy source; monitoring charge level of the chargeable energy source; and converting energy from the chargeable energy source into energy receivable by the load when said charge level of the chargeable energy source is at or above a threshold charge level.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

FIGS. 19a–19f show driving timing signals for the transistor in the DC-to-DC converter and the transistors in the DC blocker and inverter of FIG. 11;

DETAILED DESCRIPTION OF THE PREFERRED EMBODIMENTS

Figure 1:
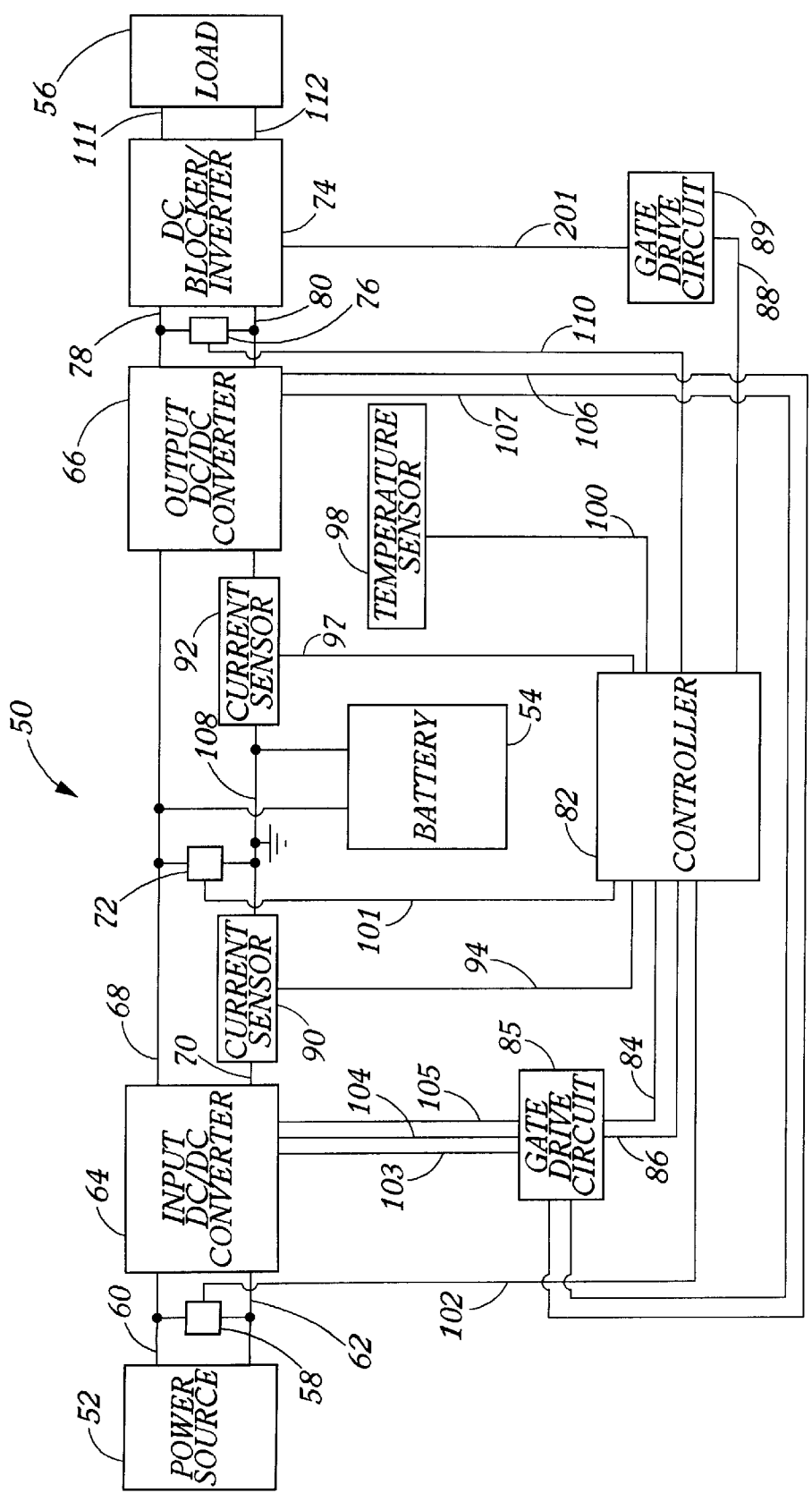
FIG. 1 shows a functional block diagram of the operative components of the power supply and charging system of the present invention.

A power supply and charging system 50 of the present invention, as illustrated in FIG. 1, includes a power or energy source 52 for generating electric energy or power to be delivered to a battery 54 for charging and recharging the battery or battery circuit 54 and to a load 56. The battery 54 can be used to provide electric energy and power to the load 56 during periods of time when the power source 52 cannot supply sufficient energy or power to the load 56. The power supply and charging system 50 also includes voltage sensor 58 for monitoring the output voltage of the power source 52 on the nodes 60, 62, a DC-to-DC converter 64 that takes the DC energy and power supplied from the power source 52 on the nodes 60, 62 and regulates the energy and power for delivery to the battery 54 and to DC-to-DC converter 66 via the nodes 68, 70. A voltage sensor 72 monitors the voltage of the battery 54.

The DC-to-DC converter 66 takes energy and power supplied by either the power source 52 (via the DC-to-DC converter 64) or the battery 54 and converts or boosts its voltage into a form suitable for input to the DC blocker and inverter 74. Energy or power supplied by the DC-to-DC converter 66 to the load 56 preferably first passes through the DC blocker and inverter 74 in order to block or prevent any DC current or voltage from being supplied or delivered to the load 56 and to generate the proper AC input signal for the load 56. The system 50 also includes a voltage sensor 76 for monitoring the output voltage of the DC-to-DC converter 66 on the nodes 78, 80 and a controller, computer, or microprocessor 82 for monitoring the current and voltage levels at different points in the system 50. The controller 82 controls the operation of the DC-to-DC converter 64 via the node 84 and gate drive circuit 85, the operation of the DC-to-DC converter 66 via node 86 and the gate drive circuit 85, and the operation of the DC blocker and inverter 74 via four control node(s) 88*a*, 88*b*, 88*c*, 88*d*, (represented by 88 in FIG. 1) and the gate drive circuit 89.

The controller 82 is coupled to a current sensor 90 via node 94 and a current sensor 92 via node 97. The current sensors 90, 92 allow the controller 82 to measure or monitor electric current charging or discharging the battery 54, respectively. The controller 82 is also connected or coupled to temperature sensor 98 via node 100. The temperature sensor 98 monitors the battery 54 temperature such that the controller 82 can adjust the operation of the system 50 to optimize battery charging and load operation for different temperature conditions and to reduce or prevent deep discharge of the battery 54, as will be discussed in more detail below. The temperature sensor 98 can be, for example, a ten thousand ohm thermistor manufactured by Keystone Thermometrics of St. Marys, Pa. The controller 82 is coupled to the voltage sensor 72 via node 101 and the voltage sensor 58 via node 102.

As previously discussed above, the controller 82 controls the operation of the DC-to-DC converter 64 via the node 84 and the gate drive circuit 85 and the DC-to-DC converter 66 via the node 86 and the gate drive circuit 85. The gate drive circuit 85 is connected to DC-to-DC converter 64 via the nodes 103, 104, 105 and the DC-to-DC converter 66 via the nodes 106, 107. Each of these components of the system 50 will be discussed in more detail below.

A significant feature of the apparatus and method of the present invention is that the system 50 improves the charging of a battery or battery circuit and the delivery of electric power and energy to a load, particularly if the load is an AC lighting system or lamp. AC lighting systems are prone to failure if any amount of DC current is injected into them during operation. Therefore, the system 50 reduces, and preferably prevents, any DC current from reaching the load 56 to extend the operational life and reliability of the load 56.

A further significant feature of the apparatus and method of the present invention is that the system 50 allows for energy to be supplied to a load on a dynamically varying basis such that energy is supplied from a battery to the load for different or varying periods of time depending on the capability of a power or energy source to charge the battery. Therefore, daily and seasonal variations in supply of energy from the power or energy source to the battery (which charge the battery) are taken into account when determining when to supply energy from the battery to the load (which discharges the battery).

Another significant feature of the apparatus and method of the present invention is that the system 50 reduces, and preferably prevents, deep discharge of the battery or battery circuit 54. Deep discharge of a battery will occur when the power source 52 does not produce sufficient energy to fully recharge the battery over a prolonged period of time such as days, weeks, months. This can occur when users do not install enough power source 52 generating capacity, or when weather conditions limit power source 52 generation, or when part of the power source 52 fails resulting in reduced output power of the power source 52. If a battery or group of batteries operate for a long period of time at a low state of charge, or if they are frequently deep discharged, the energy storage capacity of the battery or group of batteries will be irreversibly reduced. Therefore, the battery or group of batteries will often fail sooner than if the batteries are properly maintained. Proper maintenance of a battery or a group of batteries 54 usually requires maintaining the battery near full state of charge most of the time, adjusting the charging voltage based upon battery temperature and battery chemistry, and to provide a proper level of overcharge each day.

Conventional battery charging systems generally prevent excessive deep discharge by using a low voltage disconnect (LVD) which disconnects a load from the battery when the voltage of the battery falls below some specified set point, which might be, for example, 11.5 volts for a twelve volt battery. The load is not reconnected to the battery until the battery charge rises back above a minimum threshold level, which might be, for example, 12.5 volts to thirteen volts for a twelve volt battery, and recharging of the battery has begun. The system 50 of the present invention prevents, or at least reduces the likelihood of, excessive deep discharge of the battery 54 by monitoring the charge and discharge rates of the battery 54. By monitoring the charge and discharge rates of the battery 54, the controller 82 can adjust the amount of time that the battery is allowed to supply energy and power to the load 56 such that the battery 54 does not become excessively discharged. Therefore, the system 50 provides sufficient energy or power to the load 56 while the battery 54 is kept near a full charge a significant amount of the time during operation of the system 50. During periods when reduced energy is available from the power source 52, the load 56 is operated a reduced number of hours, and disconnected before the battery 54 voltage drops to the LVD voltage. Each of the significant features of the present invention discussed above, as well as others, will be discussed in more detail below.

The power source 52 of the system 50 can be any type of DC energy or power generating source, such as a solar cell, solar panel, photovoltaic device, wind turbine, hydroelectric generator, geothermal generator, etc., and the system is not limited by the type of energy or power generator used for the power source 52. The power source voltage which will be a DC voltage of, for example ten to eighty volts, is monitored by the voltage sensor 58 which is coupled or connected to the controller 82 via the node 102. If the power source 52 is a solar cell or some other photoelectric device, the voltage sensor 58 allows the controller 82 to sense voltage from the power source 52 to determine when the system 50 is operating during daylight or at night. In addition, if a voltage level is sensed by the controller 82 via the node 102 that is greater than the voltage level of the battery 54, the controller 82 can initiate charging of the battery 54.

The DC-to-DC converter 64 is controlled by the controller 82 via the node 84 the gate drive circuit 85 and the nodes 103, 104, 105, such that the controller 82 can control the output current of the DC-to-DC converter 64 measured by the current sensor 90. The DC-to-DC converter 64 provides the capability to control the charging current flowing into the battery 54 from the power source 52. Power can flow from the power source 52 to the battery 54 when the power source voltage is equal to or greater than the battery voltage, plus a small allowance for voltage drop through the DC-to-DC converter 64.

The control signal from the controller 82 on node 84 is a pulse width modulated (PWM) logic signal. The repetition rate of the signal is one hundred kilohertz. The control signal on node 84 is level shifted by the gate drive circuit 85 to turn on and off the transistor or power switch 128 via the nodes 103, 104, 105. The duty cycle of the signal on node 84 may vary from zero to one-hundred percent, thus allowing a full range of control of the DC-to-DC converter 64.

The controller 82 adjusts the duty cycle of the waveform on node 84 such that maximum charging current is delivered to the battery 54 during the bulk charging portion of the battery charging procedure. Charging of the battery 54 may be in one of three states. First, bulk charging of the battery 54 occurs when the battery 54 is less than eighty percent to ninety percent fully charged. During this time, maximum energy is drawn from the power source 52 for charging the battery 54 and battery voltage is lower than the regulation voltage set point determined by the controller 82. Regulation voltage set point of a battery is conventionally defined as the optimal and maximum battery voltage during battery charging. Second, regulation voltage charging of the battery 54 occurs when sufficient power is generated or otherwise available from the power source 52 and the DC-to-DC converter 64 is controlled to maintain battery voltage at the regulation voltage set point. During this time, charging current drops while battery voltage remains constant. This process is also known as constant voltage charging. The amount of time spent in regulation charge depends on the recent charge history of the battery 54. Third, finish charging of the battery 54 is the same as regulation charging, except that the regulation voltage set point is typically lower to prevent over charge of the battery 54. In this state, the battery 54 is nearly fully charged.

The controller 82 monitors the output voltage from the power source 52 on the nodes 60, 62 and controls the DC-to-DC converter 64 via the node 84 such that a desired current output signal $C_{DC/DC}$ on the nodes 68, 70 is created. The current signal $C_{DC/DC}$ may be, for example, zero to ten amps.

During charging of the battery or battery circuit 54, the battery or battery circuit 54 will draw current from the nodes 68, 108. The current sensor 90 monitors the current flowing on the node 70 and provides a signal representative of the current flowing on the node 70 to the controller 82 via the node 94. During discharging of the battery 54, the load 56 will draw current from the battery 54. The current sensor 92 monitors the current flowing on the node 109 and provides a signal representative of the current flowing on the node 109 to the controller 82 via the node 97. The battery or battery circuit 54 can be or include flooded lead-acid, captive electrolyte lead acid (VRLA), or nickel-cadmium secondary (rechargeable) storage batteries.

Figure 2:
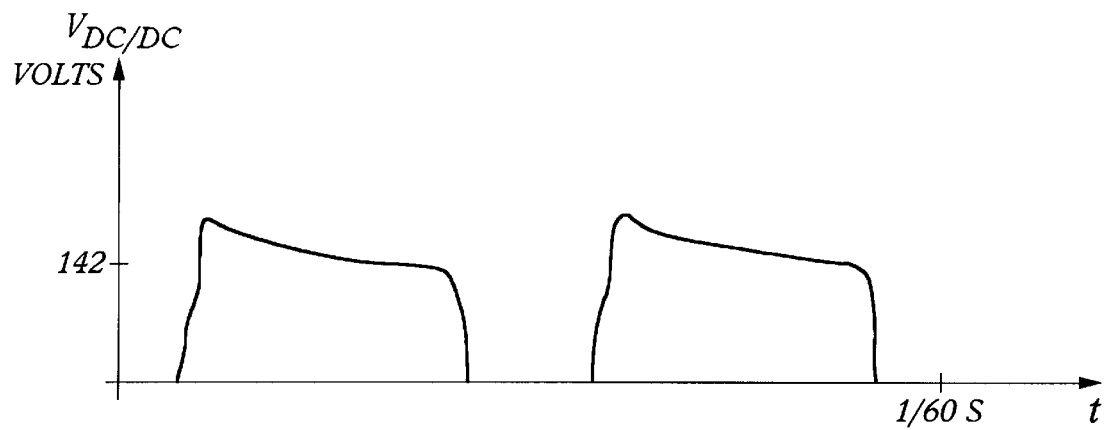
FIG. 2 shows an exemplary output voltage signal for the output DC-to-DC converter in the power supply and charging system of FIG. 1.

Energy or power supplied by either the power source 52 or the battery 54 will be delivered to the DC-to-DC converter 66 via the nodes 68, 109. The DC-to-DC converter 66 boosts the voltage on the nodes 68, 109 to a level suitable for use by the DC blocker and inverter circuit 74. For example, voltage between the nodes 68, 109 may be between ten and thirty-two volts, depending on the type of battery or battery circuit used. The DC-to-DC converter 66 may boost this voltage to more than one-hundred volts between the nodes 78, 80 and can, in a typical situation where the load is an AC lighting system, create a voltage on the nodes 78, 80 that is more than one-hundred and forty volts but less than one-hundred and seventy-five volts. The controller 82 monitors the output voltage $VD_{DC/DC2}$ from the DC-to-DC converter 66 on the nodes 78, 80 via the voltage sensor 76 which is connected or coupled to the controller 82 via the node 110. The controller 82 controls the DC-to-DC converter 66 via the node 86 and the gate drive circuit 85 such that a desired voltage output signal $V_{DC/DC2}$ on the nodes 78, 80 is created. The controller 82 creates a pulse width modulated signal on node 86, the frequency of which signal is one hundred kilohertz. A representative voltage signal $VD_{DC/DC2}$ for the DC-to-DC converter 66 between the nodes 78, 80 is shown in FIG. 2 and may have a maximum voltage of 175 volts.

Figure 3:
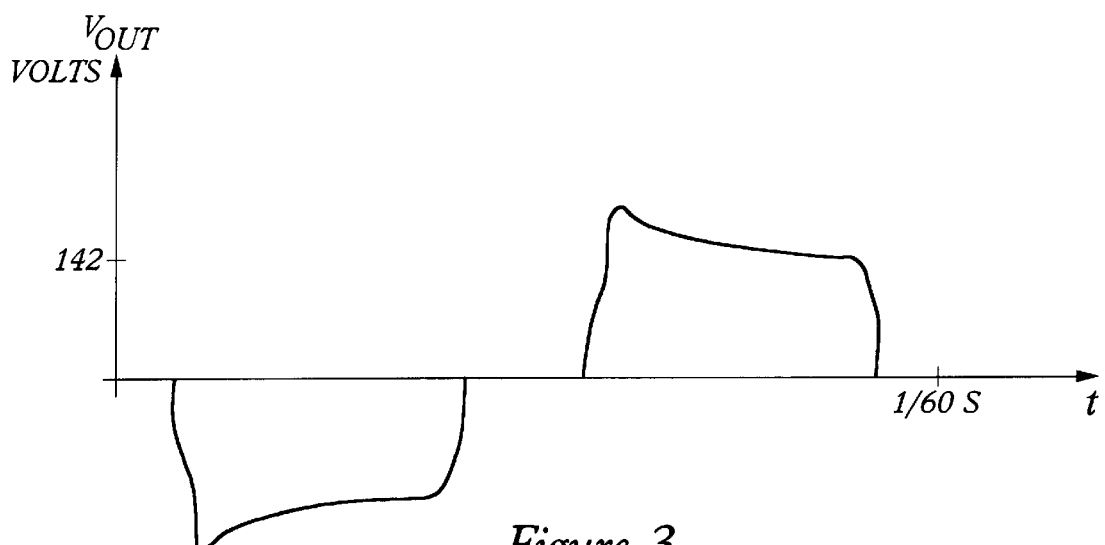
FIG. 3 shows an exemplary output voltage signal for the DC blocker and inverter in the power supply and charging system of FIG. 1.
Figure 4:
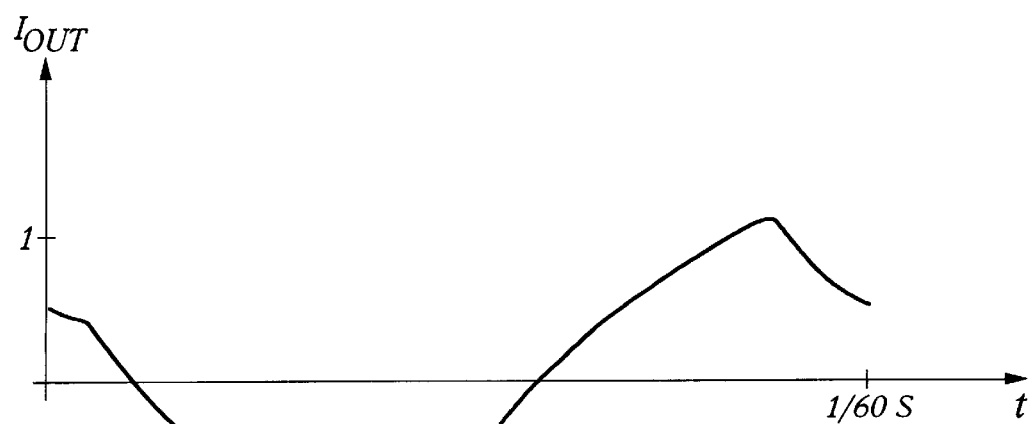
FIG. 4 shows an exemplary output current signal for the DC blocker and inverter in the power supply and charging system of FIG. 1.

The output signal V from the DC-to-DC converter 66 on the nodes 78, 80 is the input signal to the DC blocker and inverter 74 which converts the DC signal $VD_{DC/DC2}$ into an AC signal usable by the load 56 and which preferably reduces or prevents any DC current from reaching the load 56. The DC blocker and inverter 74 is coupled to and controlled by the controller 82 via the control line(s) 88 such that a desired AC signal $V_{OUT}$ is created on the nodes 111, 112 which becomes the input signal to the load 56. A representative voltage signal $V_{OUT}$ for the DC blocker and inverter 74 between the nodes 111, 112 is shown in FIG. 3 and may have a maximum voltage of approximately 114 to 126 volts RMS. A representative current signal $I_{OUT}$ for the DC blocker and inverter 74 on the node 111 when connected to a typical AC lighting load is shown in FIG. 4 and may have a maximum amperage of 2.1 amps RMS.

If the load 56 is an AC lighting or lamp system, the signal $V_{OUT}$ on the nodes 111, 112 preferably does not contain a DC voltage component and preferably no DC current is injected into the load 56 from the DC blocker and inverter 74. Also, the signal $V_{OUT}$ preferably has a sixty hertz (60 Hz) frequency and a RMS output of approximately 120 volts. In many cases where the load 56 includes an AC lighting or lamp system, the voltage signal $V_{OUT}$ will not need to be a sine wave. A sine wave or sinusoidal voltage signal is not needed because, when the lamp is operating, the lamp appears electrically as a resistor to dissipate the electrical power delivered to the lamp and, as a result, to generate light, as will be discussed in more detail below. In addition, the ballast for many lighting or lamp systems may not need a sine wave voltage signal to operate properly.

Figure 5:
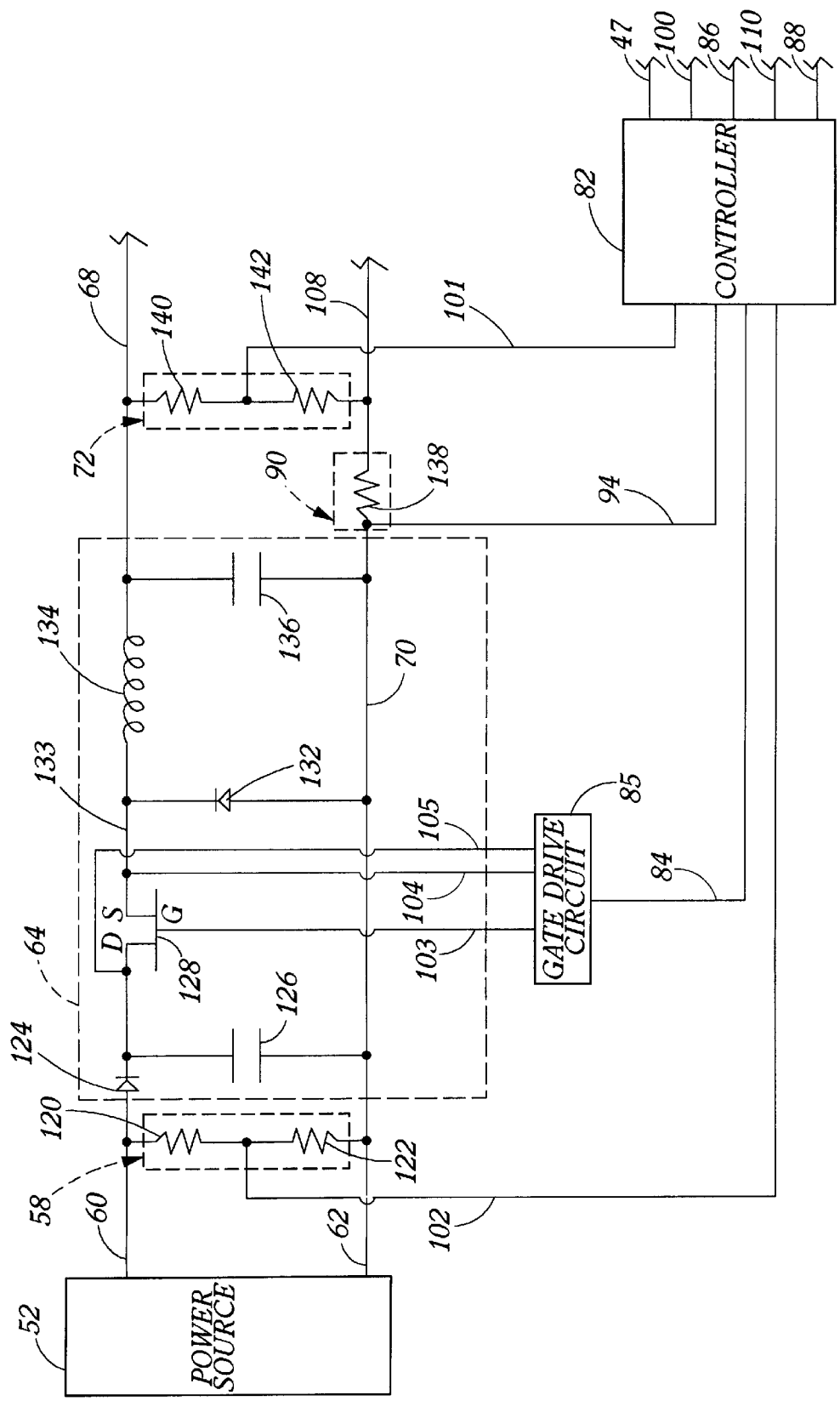
FIG. 5 shows an exemplary schematic diagram of voltage sensors, a current sensor, and the input DC-to-DC converter in the power supply and charging system of FIG. 1.

Now referring to FIG. 5, a discussion and description of a representative implementation of the system 50 will now be provided. As previously discussed above, the power source 52 provides a DC voltage and current on the nodes 60, 62 which is sensed by the voltage sensor 58 coupled between the nodes 60, 62. The voltage sensor 58 includes resistors 120, 122 which form a voltage divider to reduce the voltage produced by the power source 52 to a level suitable for input to the controller 82 on the node 102. The resistor 120 can have a value of, for example, 69,800 ohms and the resistor 122 can have a value of, for example 2,490 ohms.

As previously described above the DC-to-DC converter 64 controls the battery charging current flowing into the battery 54 from the nodes 68, 108 and created by the power source 52. The DC-to-DC converter 64 can take the form of, for example, a buck converter.

The diode 124 is preferably a shottky diode, which means it has a lower forward voltage drop than a regular diode. The diode 124 can be, for example, a 8TQ100S shottky rectifier manufactured by International Rectifier of El Segundo, Calif., U.S.A. The diode 124 prevents reverse power flow from the battery 54 back into the power source 52. Therefore, if the power source 52 is a solar cell or some other type of photovoltaic device, the diode 124 helps prevent excessive energy loss at night or if the power source 52 is connected backwards during installation.

The capacitor 126 filters current pulses drawn by a transistor or power switch 128 so that the power source 52 can supply nearly a constant DC input current on the node 60. Therefore, if the power source 52 is a solar cell or some other kind of photovoltaic device, the power source 52 can operate at its maximum power point if the signal produced on the node 84 is properly controlled to track the maximum power point of the power source 52. The capacitor 126 can have a value of, for example, thirty microfarads.

Figure 6:
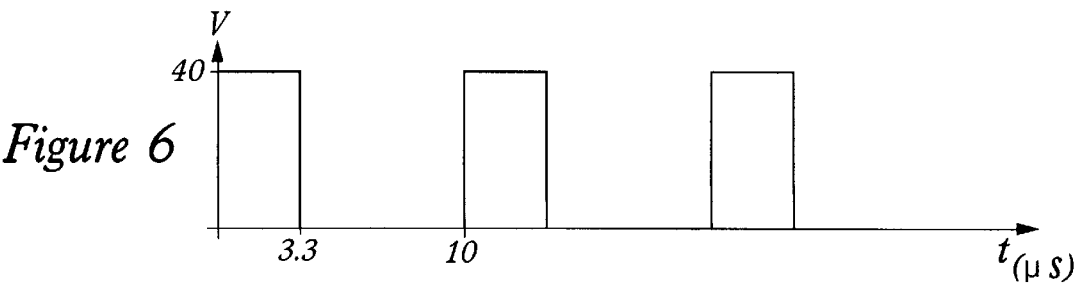
FIG. 6 shows a representative voltage signal between the drain and the source of the transistor in the input DC-to-DC converter of FIG. 5.
Figure 7:
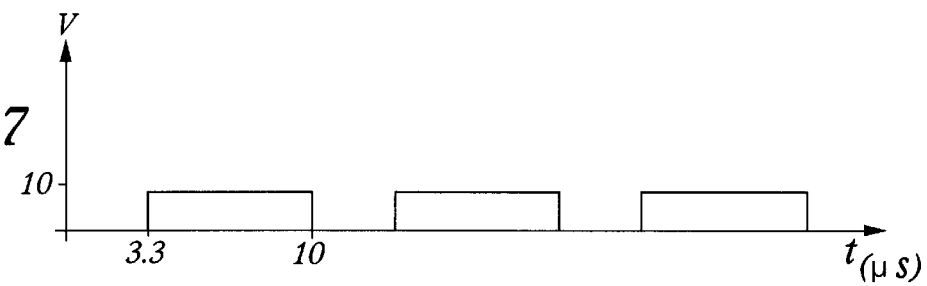
FIG. 7 shows a representative voltage signal between the gate and the source of the transistor in the input DC-to-DC converter of FIG. 5.

The transistor or power switch 128, which can be a mosfet or other similar solid state switching device, controls the power transfer from the nodes 60, 62 to the nodes 68, 70. The transistor 128 can be, for example, a IRF3710S mosfet manufactured by International Rectifier of El Segundo, Calif. U.S.A. The operation of the transistor 128 is controlled by the controller 82 via the node 84 which is connected to the gate drive circuit 85. The gate drive circuit 85 converts a zero to five volts signal received from the controller 82 on the node 84 and converts it into a zero to ten volts signal with voltage level shifting for driving and controlling the transistor 128 via the nodes 103, 104. A representative voltage signal between the drain (node 105) and the source (node 104) of the transistor 128 is shown in FIG. 6. A representative voltage signal between the gate (nodel 03) and the source (node 104) of the transistor 128 is shown in FIG. 7. The controller 82 can control the duty cycle of the transistor 128, i.e., the ratio of the time the transistor 128 is turned on to the on plus off time of the transistor the node create desired signals on the node 68.

The diode 132 is preferably a shottky type diode, rated for one-hundred volts and eight amperes of average forward current. The diode 132 can be, for example, a 8TQ100S shottky rectifier manufactured by International Rectifier of El Segundo, Calif. When the transistor 128 turns off, i.e., when there is no current flowing between the drain and source of the transistor 128, electric current in the inductor 134 must still flow because the inductor 134 will inhibit or oppose any change in the current flowing through it. Therefore, when the transistor 128 is off, electric current conducts through the diode 132 for supply to the inductor 134. When the power switch 128 is on, voltage is applied across the inductor 134, such that inductor 134 current increases. When the power switch 128 is off, inductor current forces the diode 132 to turn on, inductor current decreases until inductor current reads zero or power-switch 128 turns on again.

Figure 8:
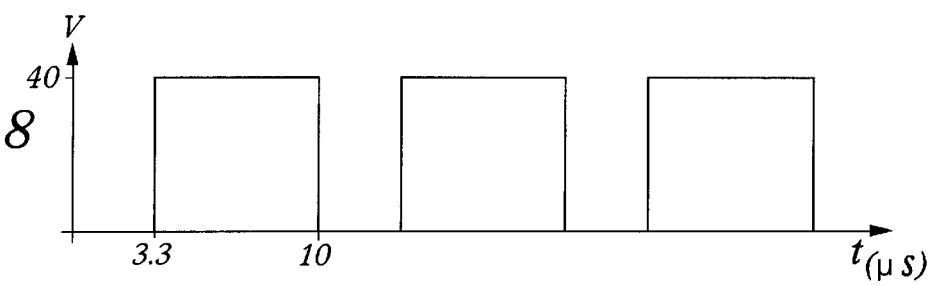
FIG. 8 shows a representative voltage signal across a diode in the input DC-to-DC converter of FIG. 5.
Figure 9:
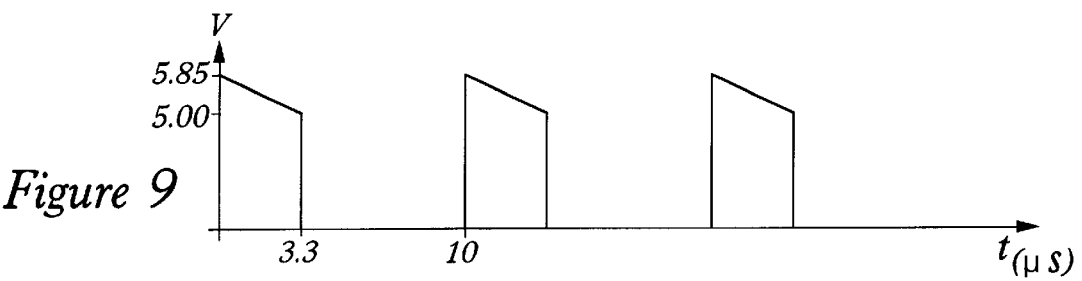
FIG. 9 shows a representative current signal for current flowing through the diode of FIG. 8.

Inductor 134 current is filtered by a capacitor 136. Current sensor 90 converts the filtered output current of the DC-to-DC converted to a voltage suitable for measurement by the controller 82. A representative voltage signal across diode 132 between the nodes 133, 70 is shown in FIG. 8. A representative current signal for current flowing through the diode 132 is shown in FIG. 9.

Figure 10:
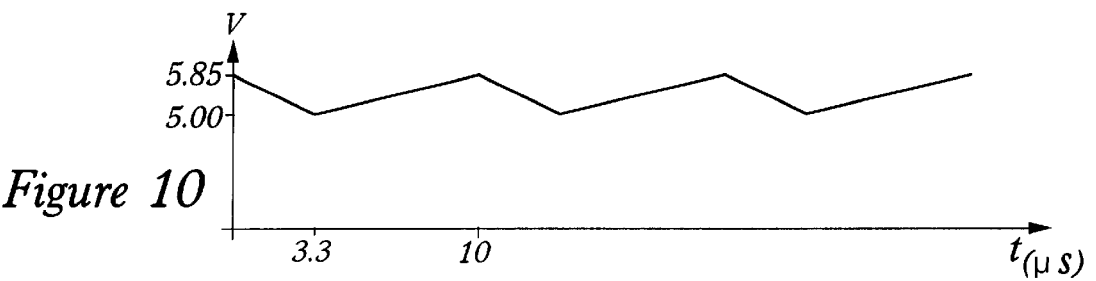
FIG. 10 shows a representative current signal of the current flowing through the inductor in the input DC-to-DC converter of FIG. 5.

The inductor 134 serves as an output filter inductor. Since the current flowing though the inductor 134 will not change instantaneously, because the inductor 134 attempts to maintain a constant current flowing through it, the inductor 134, along with the capacitor 136, act as a filter to smooth the output current flowing from the transistor 128 and the diode 132 and which forms the charging current into the battery 54. A representative current signal of the current flowing though the inductor 134 is shown in FIG. 10. The inductor can have a value of, for example, one hundred microhenries.

The capacitor 136, while not absolutely necessary, preferably forms part of the output filter with the inductor 134. The capacitor 136 can help reduce electromagnetic emissions from the system 50 and will help smooth the current flowing on the node 68 more than the inductor can do by itself. The capacitor 136 can have a value of, for example, ten microfarads.

The resistor 138 forms part of the current sensor 90. The resistor 138 converts the output current flowing on the node 70 into a voltage signal suitable for use by the controller 82. Therefore, the resistor 138 allows the controller 82 to measure battery charging current via the node 94. The resistor 138 can have a value of, for example, 0.015 ohms. The controller 82 can adjust the duty cycle of the transistor 128 such that the current flowing through the resistor 138 is maximized or until the power source 52 is operating at its maximum power generating point.

As previously discussed above, the voltage sensor 72 allows the voltage between the nodes 68, 108 to be measured and monitored. The voltage sensor 72 includes resistors 140, 142 which form a voltage divider to reduce the voltage produced between the nodes 68, 108 to a level suitable for input to the controller 82 on the node 101. The resistor 140 can have a value of, for example, 39,200 ohms and the resistor 142 can have a value of, for example 2,490 ohms.

The controller 82 can include just about any type of computer, microprocessor, etc. that can perform the functions provided herein. The controller 82 can include, for example, a PIC14000 Micro Controller manufactured by MicroChip Corporation of Chandler, Ariz., U.S.A. and a power LM2524D control chip manufactured by National Semiconductor of Arlington, Tex., U.S.A. as will be discussed in more detail below. As previously discussed above, the controller 82 controls the operation of the DC-to-DC converter 64, the DC-to-DC converter 66, and the DC blocker and inverter 74 to create sufficient input signals to the battery 54 on the nodes 68, 108, and to the load 56 on the nodes 111, 112.

The control of the transistor 128 by the controller 82 will cause the battery 54 to charge when power is available from the power source 52 as determined by the voltage sensing signal 102 and current sensing signal 94.

Now referring to FIG. 11, additional components of the system 50, including the DC-to-DC converter 66, the voltage sensor 76, and the DC blocker and inverter 74 will now be described in more detail. The DC-to-DC converter 66 can be configured as a boost converter. The DC-to-DC converter 66 preferably acts to boost the voltage from the battery 54 to a level suitable for use by the DC blocker and inverter 74 to allow the DC blocker and inverter 74 to create the AC output signal $V_{OUT}$ on the nodes 111, 112 needed for the load 56.

Figure 12:
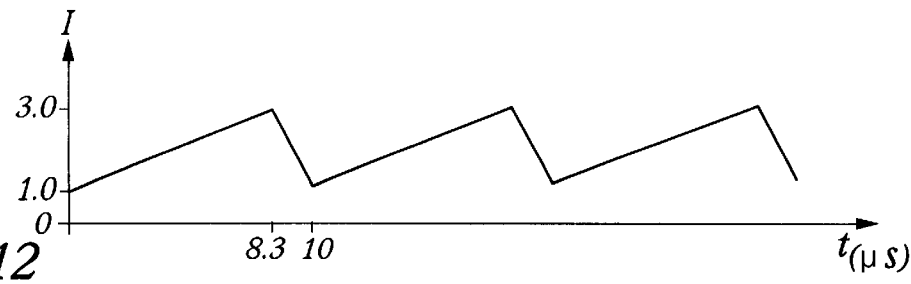
FIG. 12 shows a representative current signal of the current flowing through the inductor in the output DC-to-DC converter of FIG. 11.

The DC-to-DC converter 66 includes inductor 160 which acts as filter as previously described above. A representative current signal of the current flowing though the inductor 160 is shown in FIG. 12 and may have a maximum amperage of ten amps. The inductor 160 can have a value of, for example, one hundred microhenries.

Figure 13:
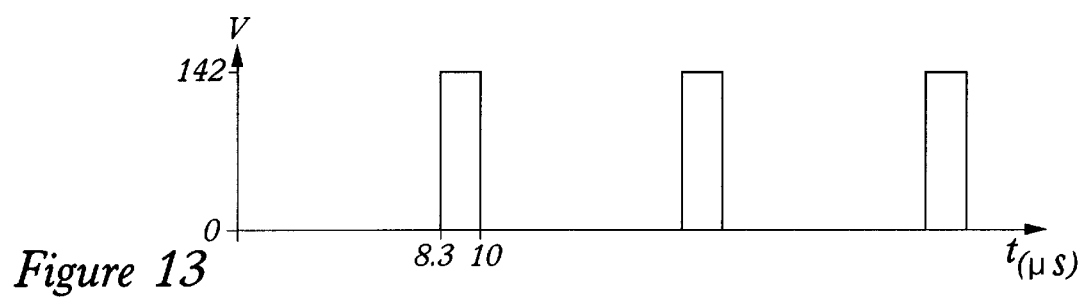
FIG. 13 shows a representative voltage signal between the drain and the source of the transistor in the output DC-to-DC converter of FIG. 11.
Figure 14:
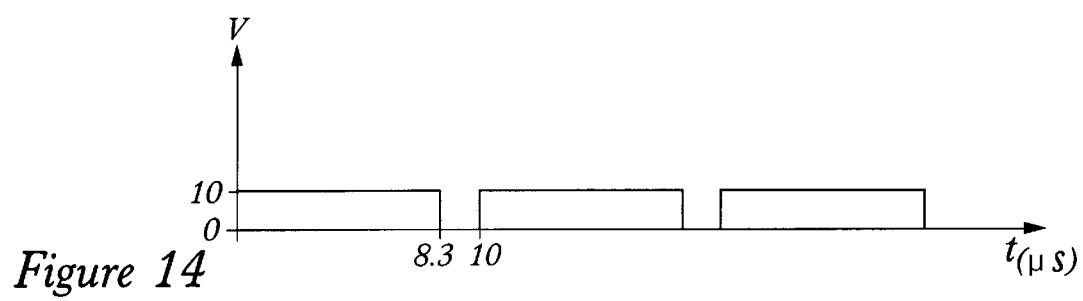
FIG. 14 shows a representative voltage signal between the gate and the source of the transistor in the DC-to-DC converter of FIG. 11.

The DC-to-DC converter 66 also includes transistor or power switch 162, which can be a mosfet or other similar solid state switching device, controls power conversion in the DC-to-DC converter 66. The transistor 162 can be, for example, a IRF640S mosfet manufactured by International Rectifier of El Segundo, Calif. The transistor 162 is controlled by the controller 82 via the node 86 which is connected to the gate drive circuit 85 and the nodes 106, 107. The gate drive circuit 85 converts the logic signal of zero to five volts to a voltage level between zero and ten volts, which is sufficient to drive and control the transistor 162. A representative voltage signal between the drain and the source (node 106) of the transistor 162 is shown in FIG. 13 and may have a maximum voltage of 175 volts. A representative voltage signal between the gate (node 107) and the source (node 106) of the transistor 162 is shown in FIG. 14 and may have a maximum voltage of 12 volts. The controller 82 can control the duty cycle of the transistor 162, i.e., the ratio of the time the transistor 162 is turned on to the total on and off times of the transistor 162, to create desired signals on the node 78. In addition, the controller 82 can adjust the duty cycle of the transistor 162 such that the voltage of capacitor 168 is properly controlled.

Figure 15:
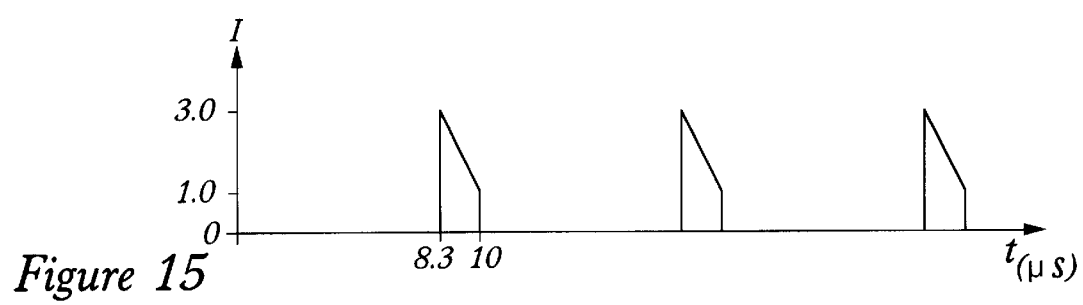
FIG. 15 shows a representative current signal of the current flowing through the diode in the DC-to-DC converter of FIG. 11.

A diode 166 is also part of the DC-to-DC converter 66. When the transistor 162 is turned off such that no current is flowing between the drain and source of the transistor 162, current from the inductor 160 passes or flows through the diode 166 to charge the capacitor 168 and provide power to the load 56. When the transistor 162 is turned on, such that current is flowing between the drain and source of the transistor 162, the diode 162 prevents reverse power or current flow from the capacitor 168 into the transistor 162. When the transistor 162 is turned on, the current flowing through the inductor 160 increases. When the transistor is turned off, the current flowing through the inductor 160 decreases. The diode 166 can be, for example, a 30BF20 manufactured by International Rectifier of El Segundo, Calif., U.S.A. A representative current signal of the current flowing through the diode 166 is shown in FIG. 15 and may have a maximum amperage of ten amps.

Figure 16:
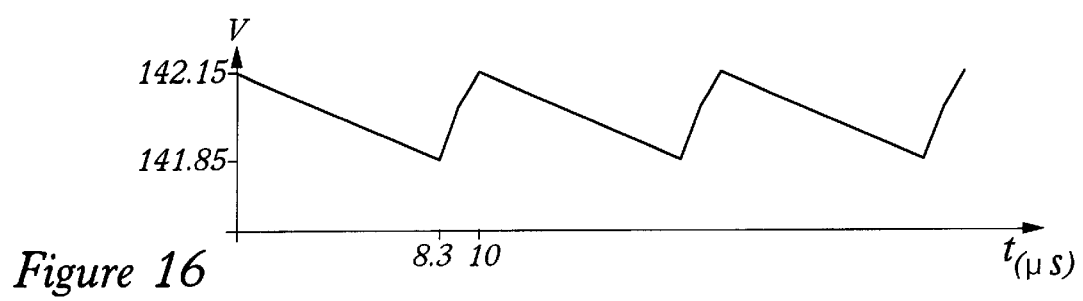
FIG. 16 shows a representative signal of a one-hundred kilohertz voltage ripple across the capacitor in the DC-to-DC converter of FIG. 11.

The capacitor 168 filters the output of the DC-to-DC converter 66. Current pulses through diode 166 are filtered by the capacitor 168 so that the load 56 sees a controlled voltage on the nodes 78, 80. The capacitor 168 can have a value of, for example, 9.4 microfarads. A representative ripple voltage signal across the capacitor 168 is shown in FIG. 16. A representative voltage signal across the capacitor is shown in FIG. 2. An important aspect of the present invention is that, contrary to common practice, the capacitor 168 is preferably sized small enough that it will charge and discharge depending upon the current wave form of the load 56 and control of the inverter 74, as well as control of the DC-to-DC converter 66. How small the capacitor 168 can be sized is primarily determined empirically from the largest anticipated load size and the lowest anticipated power factor anticipated for such a load. In the example system 50 described herein, the largest anticipated load would be one hundred watts and its lowest anticipated power factor would be approximately 0.4. Therefore, the RMS load current would be approximately 2.1 amps. Simulation and experiments with the system 50 indicate that a value of 9.4 microfarads for the capacitor 168 is the smallest possible value that will prevent load current from overcharging the capacitor 168.

While the capacitor 168 is preferably sized small enough as described above to reduce or prevent overcharging of the capacitor 168, the capacitor 168 is also preferably sized large enough to limit switching frequency (approximately one hundred kilohertz) voltage ripple to less than five percent at full power, and is preferably sized large enough so that anticipated inductive or capacitive load currents do not cause the capacitor 168 to overcharge beyond the voltage rating of the system 50 components.

As previously discussed above, the voltage sensor 76 allows the voltage between the nodes 78, 80 to be measured and monitored. The voltage sensor 76 includes resistors 170, 172 which form a voltage divider to reduce the voltage produced between the nodes 78, 80 to a level suitable for input to the controller 82 on the node 110. The resistor 170 can have a value of, for example, 150,000 ohms and the resistor 172 can have a value of, for example 2,490 ohms.

A resistor 174 forms the current sensor 92. The resistor 174 converts the output current flowing between the nodes 108, 109 into a voltage signal suitable for use by the controller 82. Therefore, the resistor 174 allows the controller 82 to measure battery discharging or draining current via the node 97. The resistor 174 can have a value of, for example, 0.015 ohms.

Figure 17:
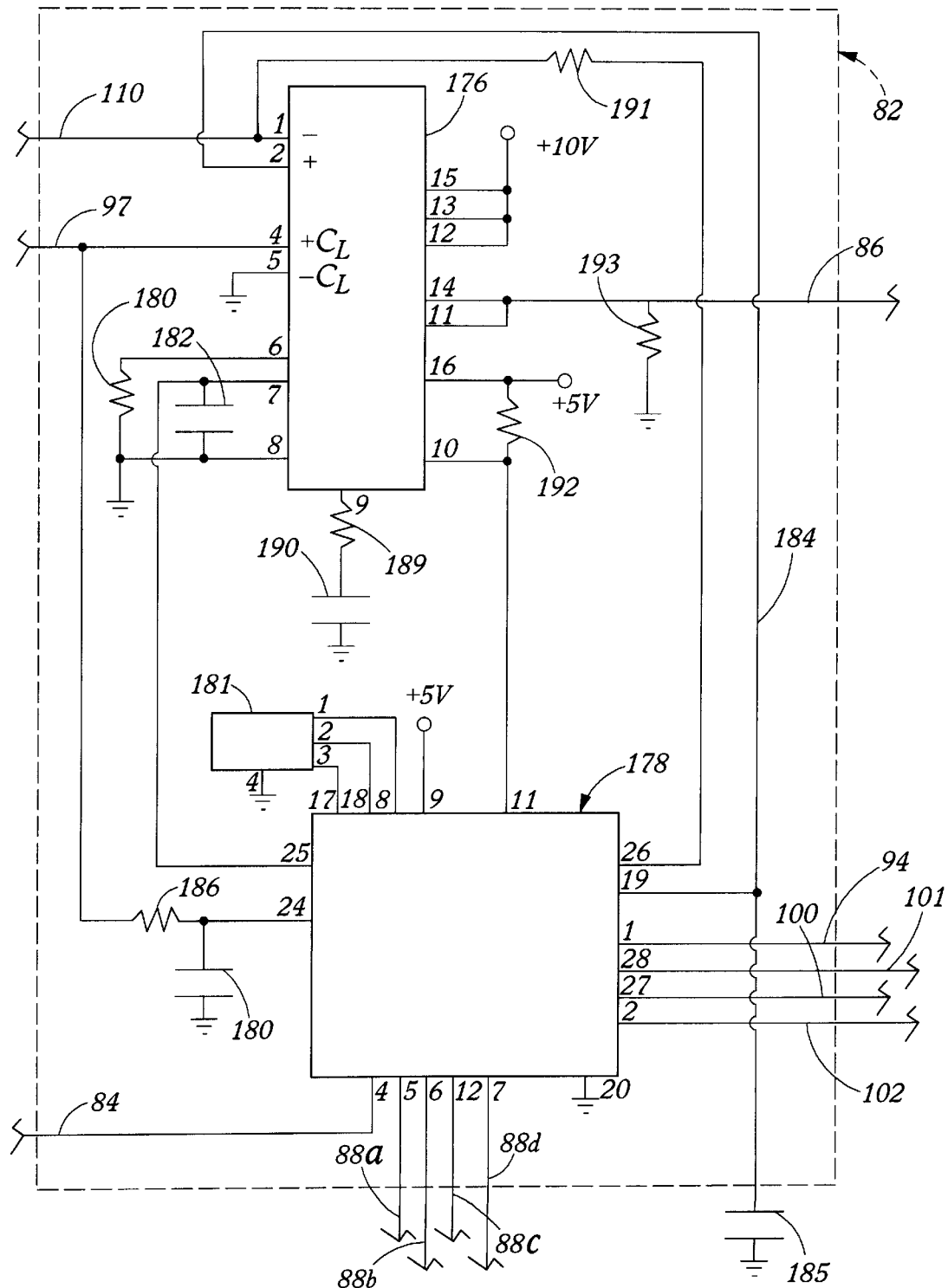
FIG. 17 shows an exemplary schematic diagram for the PWM control chip and the microprocessor included in the controller of FIG. 11.

The controller 82 includes PWM control chip 176, microprocessor 178, and a select switch 181, as best illustrated in FIG. 17. The microprocessor 178 provides a reference signal 184 to the power control chip 176 which is a direct fraction of the desired voltage across nodes 78 and 80. The fraction is determined by the voltage divider ratio of resistors 170, 172 which form a feed back signal on the node 110.

The PWM control chip 176 compares the reference signal 184 with the feedback signal 110, with an error amplifier and compensation circuit, the output of which is a voltage which corresponds to the duty cycle of the control signal 86.

The control signal 86 controls when the power switch 162 is on or off. The level of the control signal is shifted by the gate drive circuit 85 to a form suitable for driving the gate of the power switch 162. The voltage across nodes 78, 80 is controlled by the duty cycle of the signal on node 86 and the amount of power delivered to the load 56 by the system 50.

The controller 82 uses the signal on the node 97 to determine how much current is being discharged from the battery 54. If the current being drained from the battery 54 exceeds a threshold limit, the controller 82 can shut down the DC-to-DC converter 66 and protect the system 50 from damage created by connection to too large an electrical load. In addition, the signals on the node 97 are passed to the PWM (pulse width modulating) control chip 176 to prevent the DC-to-DC converter 66 from drawing to much current.

The PWM control chip 176 preferably operates as follows. Pins 6, 7 of the PWM control chip 176 are connected to a resistor 180 and a capacitor 182 which determine the time base of the PWM signal output on the node 86. In this case, these values are chosen for one hundred kilohertz operation. The value for the capacitor 182 can be, for example, one-thousand picofarads, and the value for the resistor 180 can be, for example, 68,000 ohms. The PWM control chip 176 forms a triangular voltage waveform across the capacitor 182 which is sensed by the micro-controller 178 and used to help generate the control signal on the node 84.

The output voltage of the boost converter 66 is sensed on the node 110 as negative feedback to the control chip 176. A reference signal is generated by the micro-controller 178 on the node 184, filtered by capacitor 185, and provided to the positive input (pin 2) of the control chip 176.

When the reference signal on the node 184 is greater than the voltage feedback signal on the node 110, the PWM control chip 176 acts to increase the duty cycle of the PWM output signal on the node 86. When the voltage feedback signal on the node 110 is higher than the reference signal on the node 184, the PWM control chip 176 acts to reduce the duty cycle of the PWM output signal on the node 86. Therefore, the PWM control chip 176 acts to control or regulate the output voltage of the DC-to-DC converter 66 in relation to the reference signal provided by the microcontroller 178.

The PWM control chip 176 can be, for example, a LM2524D manufactured by National Semiconductor of Arlington, Tex., U.S.A. The resistor 186 and the capacitor 180 form a low pass filter between the current sensor 92 and the microprocessor 178. The resistor 186 can have a value of, for example, one-thousand ohms and the capacitor 180 can have a value of, for example, 0.1 microfarads. A capacitor 185 is tied between the microprocessor 178 and ground and provides filter needed by the microprocessor 178 to generate a reference signal on the node 184. The capacitor 185 can have a value of, for example, 0.1 microfarads. A resistor 189 and a capacitor 190 are the compensation network required for operation of the PWM control chip 176. The resistor 189 can have a value of, for example, fifty thousand ohms. The capacitor 190 can have a value of, for example, one thousand picofarads. A resistor 191 is used to connect the voltage feed back signal 110 to the microcontroller 178 and can have a value of, for example, one thousand ohms. A resistor 192 is used to shut down PWM control chip 176 when microcontroller 178 is in reset and can have a value of, for example, twenty thousand ohms. Resistor 193 is used for pull down of the open collector output of PWM control chip 176 and can have a value of, for example, ten thousand ohms. The microprocessor 178 can be, for example, a PIC14000 Micro Controller manufactured by MicroChip Corporation of Chandler, Ariz., U.S.A.

The select switch 181 is set by a system installer or user to indicate the nominal number of hours of operation of light produced by the system 50 per night when the load 56 is a lighting system. In this embodiment, the switch 181 has eight positions, "Dusk to Dawn", "8", "6", "4", "24", "5/3", "4/2", "3/1". A single number represents the number of hours immediately after sunset. Two numbers indicate split dusk and dawn operation. The first number is the number of hours immediately after sunset and the second number is the number of hours before sunrise. The actual number of hours of operation of the system 50 will be automatically adjusted by the adaptive control method, as will be described in more detail below. The select switch 181 can be, for example, a 94HAB08RA switch manufactured by Grayhill of LaGrange, Ill., U.S.A.

As previously discussed above, the DC blocker and inverter 74 converts the DC signals on the nodes 78, 80 into AC signals on the nodes 111, 112 suitable for use by the load 56. The DC blocker and inverter 74 also blocks DC current from being injected into the load 56. The DC blocker and inverter 74 includes transistors 194, 196, 198, 200 connected to the controller 82 via gate drive circuits 89 through nodes 88a, 88b, 88c, 88d, respectfully.

Figure 18:
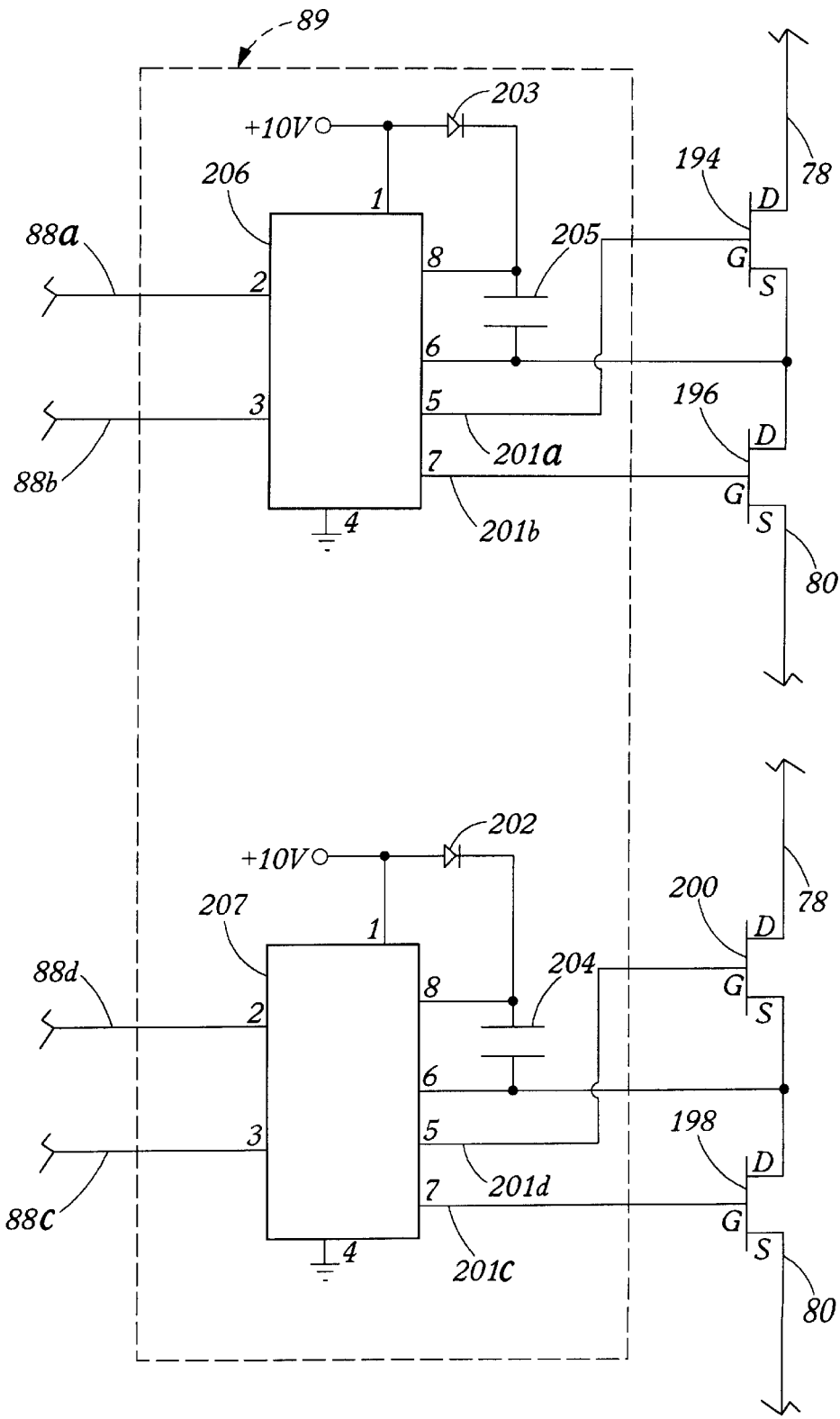
FIG. 18 shows an exemplary schematic diagram for the gate drive circuit used with the DC blocker and inverter of FIG. 1.

The transistors 194, 196, 198, 200 are driven by the controller 82 using control signals on the nodes 88a, 88b, 88c, 88d, respectfully, as best illustrated in FIG. 18. The transistors 194, 196, 198, 200 are connected to the gate drive circuit 89 via control nodes 201a, 201b, 201c, 201d, respectfully. The controller 82 can drive each of the transistors 162, 194, 196, 198, 200 independently to achieve the desired waveform on the nodes 111, 112. The gate drive circuit 89 includes two IR2101 gate drive chips 206, 207 manufactured by International Rectifier of El Segundo, Calif., U.S.A. Diodes 202, 203 are used to power the high side outputs of 206, 207 and can be IN4937 type diodes. Capacitors 204, 205 are used to provide short storage and filtering of the high side power inputs of 206, 207 and have values of, for example, 2.2 microfarads.

In general, as best illustrated in FIGS. 19a–19f, there are twelve sub intervals per full cycle of the DC blocker and inverter 74. The sub intervals 1–12 are as follows:

1. The transistors 196 and 198 are both on. The output of the DC blocker and inverter 74 is shorted, creating a zero volt output on the nodes 111, 112.
2. The transistor 198 has turned off and there is a short interval before the transistor 200 is turned on. The interval will usually be between one and one hundred microseconds.
3. The transistors 196 and 200 are both on, thereby connecting the capacitor 168 to the load 56. When the load 56 has a lagging power factor, the capacitor 168 will charge during this sub interval.
4. The transistors 196 and 200 are both on, the capacitor 168 is connected to load 56, but now the DC-to-DC converter 66 is enabled (i.e., turned on) and the transistor 162 will operate at high frequency, typically one hundred kilohertz, (FIG. 19f) thereby allowing power to flow from the battery 54 to the capacitor 168. The DC-to-DC converter 66 will regulate the capacitor 168 to approximately 142 volts but will start up slowly based on the reference signal 184 (FIG. 19e) from the microprocessor 178.
5. The transistor 162 is disabled (i e., turned off), thereby stopping power flow from the battery 54 to the capacitor 168. The load current will now act to discharge the capacitor 168 until the voltage in the capacitor 168 drops to the voltage in the battery 54, or the time of interval 5 ends.
6. The transistor 196 turns off and there is a short interval of time before the transistor 194 turns on. This sub interval is similar to sub interval 2 described above.
7. The transistors 194, 200 are on, thereby shorting the output of the DC blocker and inverter 74 to zero volts. This sub interval is similar to sub interval 1 described above.
8. The transistor 200 has turned off and there is a short interval before the transistor 198 turns on.
9. The transistors 194 and 198 are both on, thereby connecting the capacitor 168 to the load 56. When the load 56 has a lagging power factor, the capacitor 168 will charge during this sub interval.
10. The transistors 194 and 198 are both on, the capacitor 168 is connected to load 56, but now the DC-to-DC converter 66 is enabled (i.e., turned on) and the transistor 162 will operate at high frequency, typically one hundred kilohertz, thereby allowing power to flow from the battery 54 to the capacitor 168. The DC-to-DC converter 66 will regulate the capacitor 168 to approximately 142 volts but will start up slowly based on the reference signal 184 from the microprocessor 178.
11. The transistor 162 is disabled (i.e., turned off), thereby stopping power flow from the battery 54 to the capacitor 168. The load current will now act to discharge the capacitor 168 until the voltage in the capacitor 168 drops to the voltage in the battery 54, or the time of interval 11 ends.
12. The transistor 194 turns off and there is a short interval of time before the transistor 196 turns on. This sub interval is similar to sub interval 2 described above.

After the twelve sub intervals are completed, the cycle is repeated. The total time for each cycle is preferably 1/60 second so that a sixty hertz output voltage signal is created on the nodes 111, 112. By using a small value for the capacitor 168, there will be a minimum of surge current through the transistors 194, 196, 198, 200 to the load 56 at the beginning of sub intervals 3, 9. If the capacitor 168 has too large a value and the load 56 also had a large amount of capacitance across the nodes 111, 112, then there could be a large surge current through the transistors 194, 196, 198, 200 every time sub intervals 3, 9 started. A large surge current would possibly damage transistors 194, 196, 198, 200. Using a small value for the capacitor 168 also allows polyester film (or other similar) type capacitors which are usually more reliable than electrolytic capacitors. Electrolytic capacitors can often be the least reliable component in an otherwise properly designed power electronic assembly. This is because electrolytic capacitors have a liquid electrolyte inside them which evaporates over time. Electrolytic capacitors are generally used when large values of capacitance are needed, such as in conventional designs of DC-to-AC inverters. The large capacitance is usually needed when there is a need to filter the AC output power so that the DC input power has little or no AC component included, or to simplify the design of the DC-to-DC converter 66.

Figure 11:
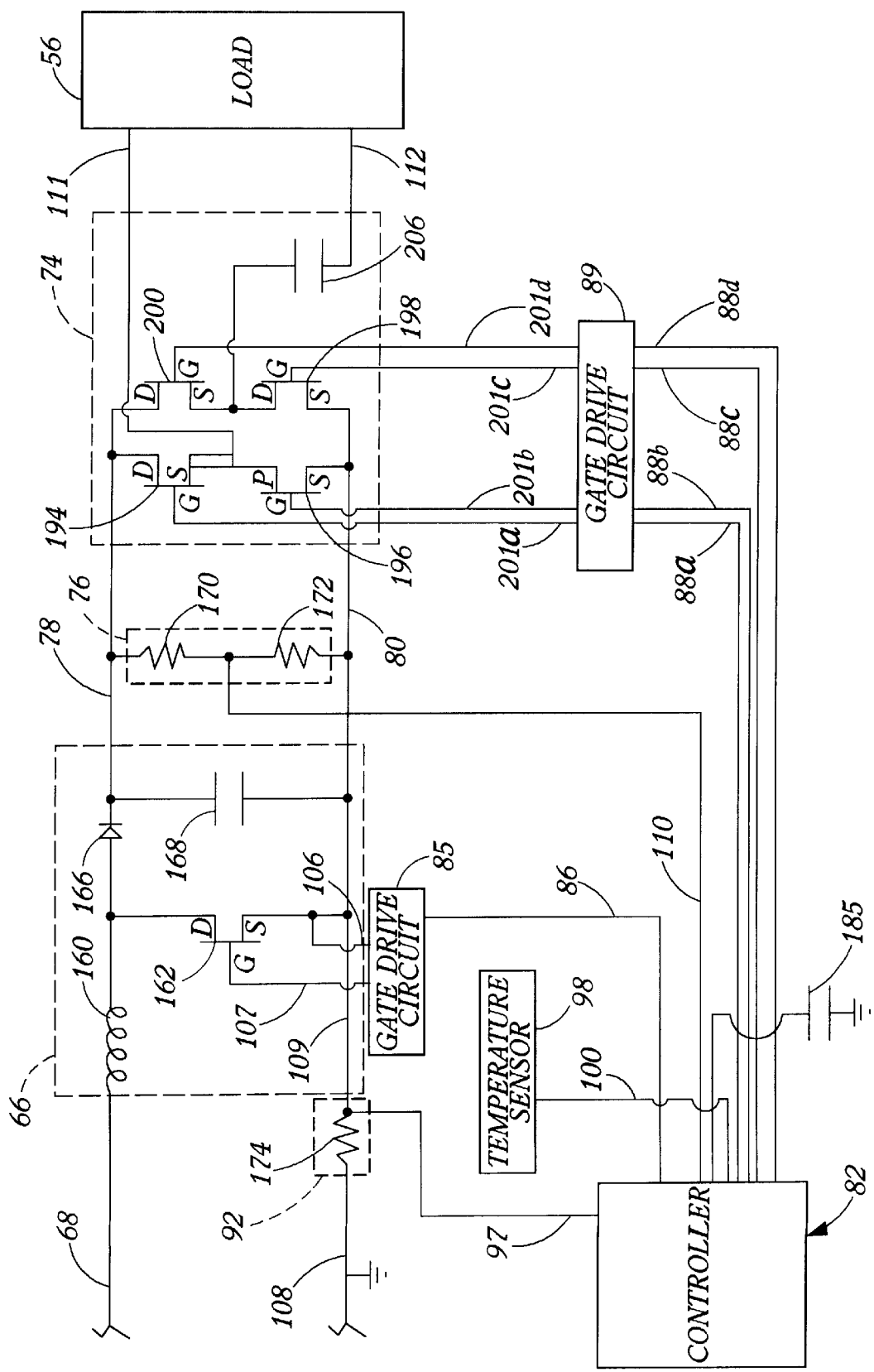
FIG. 11 shows an exemplary schematic diagram of a current sensor, a voltage sensor, and the output DC-to-DC converter and the DC blocker and inverter in the power supply and charging system of FIG. 1.

A capacitor 206 acts to block DC current from flowing to the load 56, as best illustrated in FIG. 11. The capacitor 206 can have a value of, for example, 9,400 microfarads.

Figure 20:
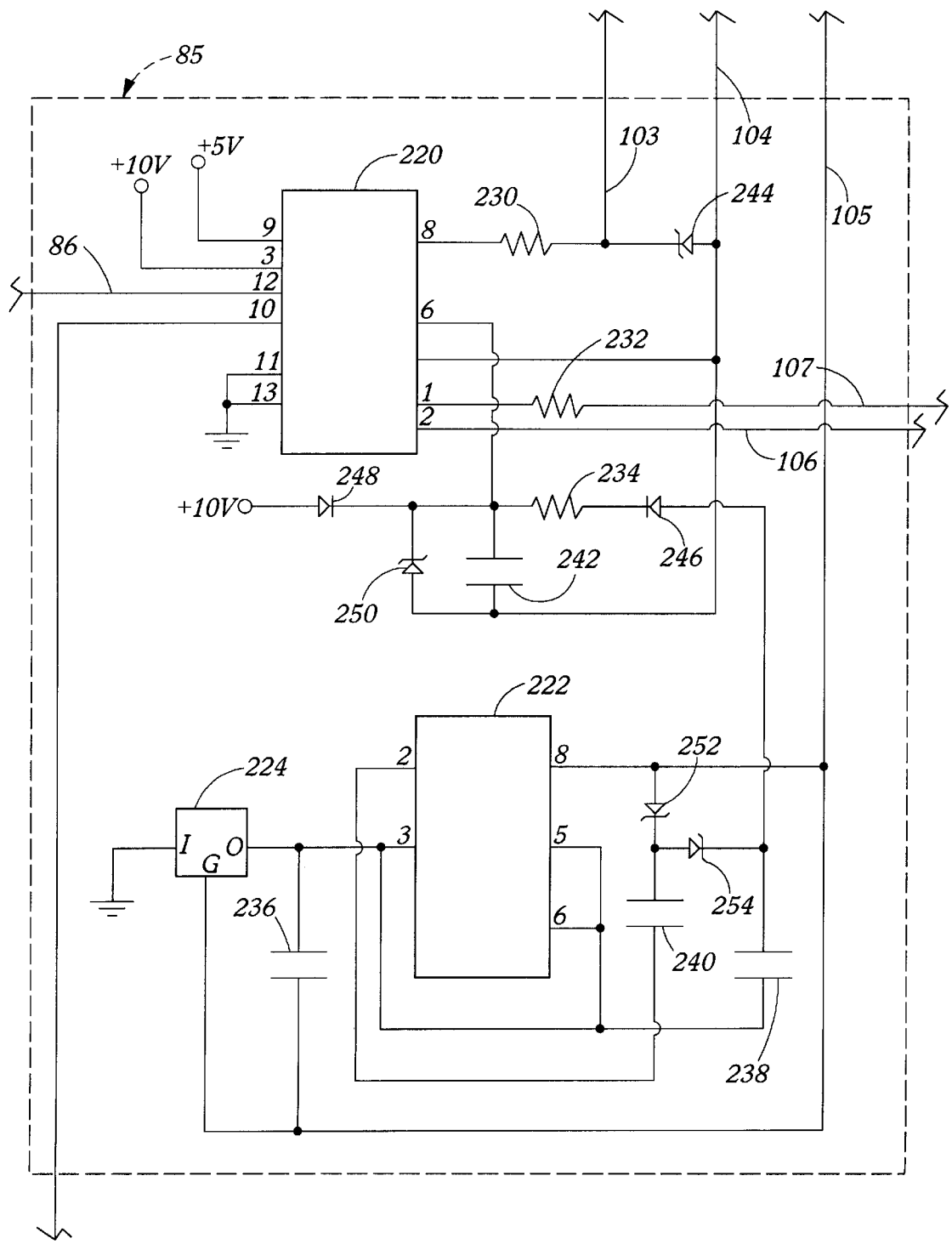
FIG. 20 shows an exemplary schematic diagram for the gate drive circuit used with the DC-to-DC converters of FIG. 1.

The exemplary output voltage for the DC blocker and inverter 74 is illustrated in FIG. 3 and represents a duty cycle of approximately 0.68. The exemplary current flowing through the load 56 is illustrated in FIG. 4. A schematic diagram for the gate drive circuit 85 is illustrated in FIG. 20 and includes an IR2110 gate drive chip 220 manufactured by International Rectifier of El Segundo, Calif., U.S.A., a MAX1044 switch cap voltage converter 222 manufactured by MAXIM Integrated Products, Inc. of Sunnyvale, Calif., U.S.A., and a LM79M12 voltage regulator 224 manufactured by National Semiconductor of Santa Clara, Calif., U.S.A.

A resistor 230 is used to control gate drive current and can have a value of, for example, ten ohms. A resistor 232 is used to control gate drive current and can have a value of, for example, ten ohms. A resistor 234 is used to limit charging current into capacitor 242 and can have a value of, for example, ten thousand ohms.

A capacitor 236 is used to filter the output of regulator 224 and can have a value of, for example, 2.2 microfarads. A capacitor 238 is used to filter the output of converter 222 and can have a value of, for example, 2.2 microfarads. A capacitor 240 is used to provide the capacitor charge pump operation of converter 222 and can have a value of, for example, 2.2 microfarads. A capacitor 242 is used to filter the high side supply of gate drive chip 220 and can have a value of, for example 2.2 microfarads.

A diode 244 is used to protect the gate to source input of transistor 128 and can be a BZT52-C12 type diode. A diode 246 can be used to prevent capacitor 242 from discharging through resistor 234 and can be a 1N4937 type diode. A diode 248 is used to provide bootstrap charge to capacitor 242 and can be a 1N4937 type diode. A diode 250 is used to prevent over charge of capacitor 242 from resistor 234 and can be a 1N5239 type diode. A diode 252 is used to charge capacitor 240 during charge pump operation and can be a 1N5239 type diode. A diode 254 is used to discharge capacitor 240 during charge pump operation and can be a 1N5239 type diode.

As previously discussed above, in many configurations, a pure sinusoidal waveform on the nodes 111, 112 is not necessary, particularly when the load is an AC lighting system. Conventional AC lighting ballasts are designed to be operated from a nearly sine wave AC power source. Therefore, operation from a highly distorted voltage waveform, as is done in the design of the present invention, runs the risk of damaging the ballast if precautions are not taken.

A square wave type power source will create increased operating audible noise from the ballast and other components unless the DC-to-DC converter 66 and the DC blocker and inverter 74 are controlled to slowly increase and decrease capacitor 168 voltage every one-half cycle. This control will act to minimize surge currents into the load 56. Another problem which will be minimized by the above control strategy is that ballasts can operate at higher than normal temperatures when driven from a highly distorted voltage. This control method will limit the amount of added temperature rise seen by the ballast. In general, the system 50 will operate to provide power and energy to the battery 54, thereby charging the battery 54, when power is available at the power source 52 and to the load 56 when there is sufficient charge remaining in the battery, and it is nighttime, and the system controller determines that the light should be on. Another important aspect of the present invention is the adaptive control of the load 56 when the load 56 includes a lighting system so that the load 56 may operate for an optimal number of hours and the battery 54 returns to near full charge most days of operation. This is important because if a battery remains in low state of charge for too long, it is more likely to freeze in the winter, causing immediate failure, and chemical processes will occur which reduce battery capacity and battery lifetime.

The number of hours of operation of the load 56 per night is decreased when the battery 54 has been unable to fully recharge during recent days of charging. Conversely, when the battery 54 has been fully recharging during recent charging activity, the number of hours of operation of the light are increased. Periodic equalization charging can be helped by first operating the light for a reduced number of hours the night before equalization charging is to begin.

An ideal output voltage of a semi-square wave inverter only has three values, +V, −V, and zero volts. In the system 50 described herein, V is the voltage across the capacitor 168. When the capacitor 168 has a small value, for example 9.4 microfarads, V will vary, so the actual output voltage of the system will vary from the ideal semi-square wave. There is an ideal value for the duty cycle of the output voltage on the nodes 111, 112 so that there is a minimum of harmonic distortion between this semi-square wave output voltage and a sine wave output voltage. Harmonic distortion is undesirable because it can increase losses in some types of ballast designs. Preferably, the duty cycle is between 0.60 and 0.75 and is optimally about 0.68. When the duty cycle of the output voltage signal on the nodes 111, 112 is approximately 0.68, and V (the voltage across the capacitor 168) is equal to 142 volts, the RMS value for the output voltage on the nodes 110, 112 is approximately 120.4 volts.

The voltage across the capacitor 168 charges and discharges based on the current flowing through the load 56 during sub-intervals 3, 5, 9, 11. That is, the capacitor 168 charges during intervals 3, 9 and discharges during intervals 5, 11 when the load 56 has an inductive component, as is typical in ballast designs. The capacitor 168 is preferably charged to approximately 142 volts. When the transistor 162 is enabled (i.e., turned on) by the controller 82 via the node 86, there may be a short transient in which the capacitor 168 overshoots the target voltage of 142 volts. The capacitor 168 will not discharge below the battery voltage, because the diode 166 will prevent this. The charging and discharging of the capacitor 168 will depend, at least in part, on the size of the load 56, the size of the capacitor 168 itself, and the load power factor.

In a typical high-pressure sodium ballast and lamp for the load 56, the ballast and lamp can be electrically modeled as an inductor in series with a resistor. The load current typically will have a high content of harmonics and appear somewhat triangular or non-sinusoidal. The load current will also lag (in time) behind the voltage waveform on the nodes 111, 112. The capacitor 168 is charged and discharged by the load current as a result of this lagging effect. During sub-intervals 3, 5, 9, 11 the DC-to-DC converter 66 is off, and the capacitor 168 is connected to the load 56. During sub-intervals 3, 9 the load current is non-zero and acts to charge the capacitor 168. During sub-intervals 5, 11, the load current is non-zero and acts to discharge the capacitor 168.

Figure 21:
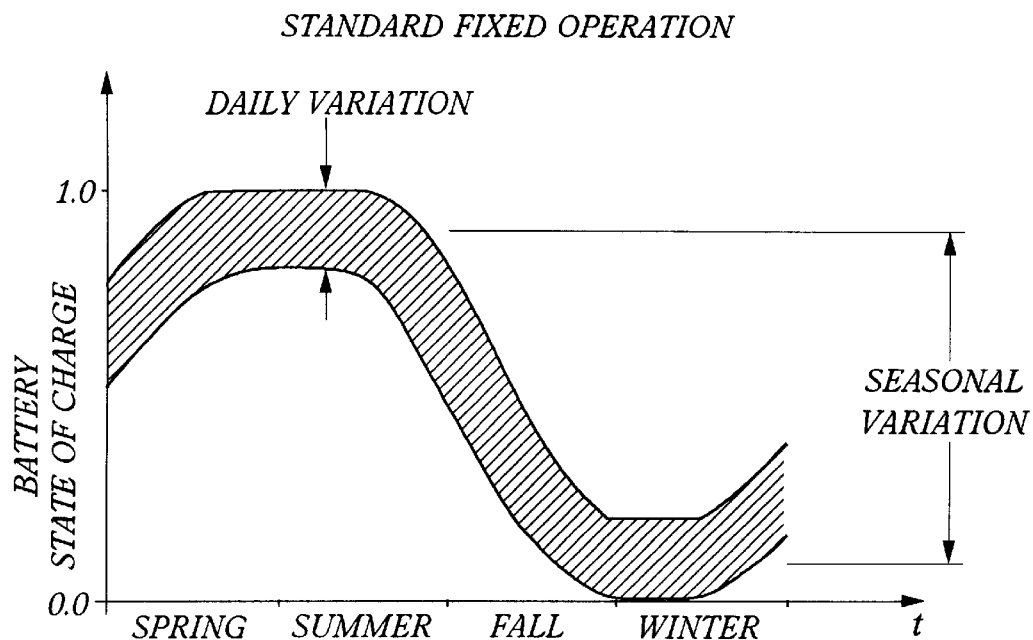
FIG. 21 shows how a battery state-of-charge (SOC) may vary over the course of a year when the system of FIG. 1 is used to supply energy to a lighting system.

FIG. 21 shows a graph of how battery state-of-charge (SOC) might vary over the course of a year in a typical photovoltaic powered lighting implementation of the system 50. In the spring and summer months, there is typically an abundance of sunlight available yielding excess energy from the photovoltaic power source, relative to the amount of energy consumed by the lighting load. Hence, battery state-of-charge often reaches full capacity, indicated as 1.0. If the system is marginally designed, in terms of relative sunlight energy available to lighting load energy required, then the average state of charge of the battery will drop towards zero during periods when sunlight is scarce, late fall and winter. For the purpose of definition, a battery capacity of zero means that battery voltage has dropped low enough, to activate the low voltage disconnect (LVD) function, which turns off power flow to a load (such as the load 56) until the battery (such as the battery 54) has had a chance to recharge some. Even systems which are not marginally designed, can still see conditions due to weather extremes and other factors which cause the battery to remain in low state-of-charge for days, weeks and sometimes months at a time.

In typical lighting systems using a photovoltaic or other solar cell type device for the power source 52, the hours of operation of the light are fixed year round, so the daily variation in SOC is nearly the same, 0.2 in FIG. 21. Such a system must be designed to meet the minimum hours of operation, even in the winter months, or risk premature battery failure. It is a generally accepted rule of thumb, that if a photovoltaic lighting system survives the winter months of operation, it can be counted on to last to the following fall. Note that a wind resource is typically much less predictable that the sun. Since the sun can be expected to rise each day, the problem of premature battery failure is even more difficult for wind powered lighting systems (i.e., when the power source 52 is a wind turbine), which practically do not exist at all today, but may be enabled by or usable with an adaptive control method described in more detail below.

Figure 22:
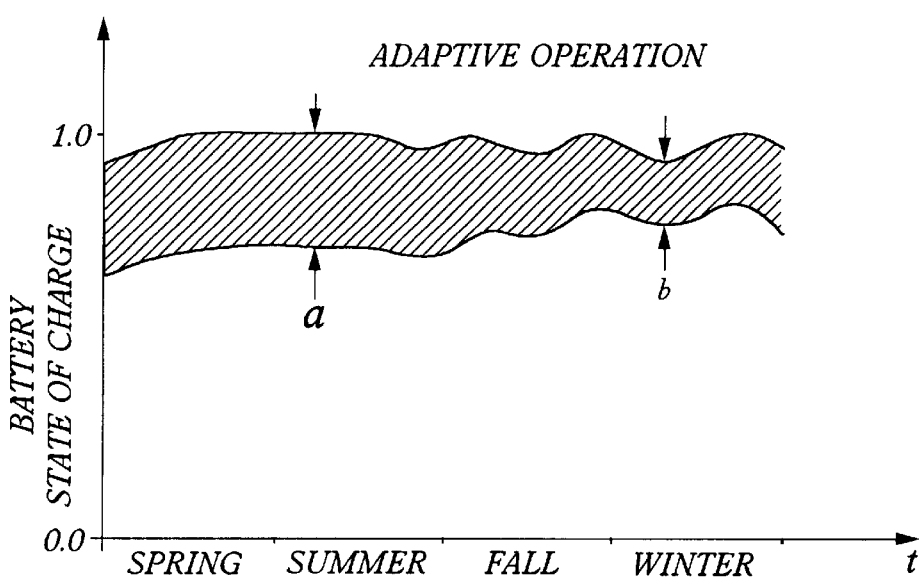
FIG. 22 shows variation in a battery state-of-charge when the system of FIG. 1 is used with an adaptive control method in accordance with the present invention.

One method of operating the system 50 acts to prevent operation at low state of charge for the battery 54 for long periods of time, thus improving battery health. FIG. 22 shows the battery state-of-charge in such a system using an adaptive control method in a typical photovoltaic powered lighting implementation of the system 50. Note that the daily variation in state-of-charge is greater in the spring and summer months than the fall and winter months. This is because the adaptive control method will act to operate the lighting load longer, extracting more energy from the battery each day, during periods when there is more power source energy available. The adaptive control method also acts to nearly eliminate the seasonal variation in battery state-of-charge. The adaptive control method will reduce the number of hours of operation of the lighting load during periods of reduced power source energy availability, such as the fall and winter months for a photovoltaic powered lighting system.

Actual system performance both for standard fixed operation as seen in FIG. 21, and adaptive control as seen in FIG. 22, will vary outside the bounds shown in FIGS. 21 and 22. FIGS. 21 and 22 provide a representative illustration that the adaptive control method will on average operate with a significantly higher battery state-of-charge, than the present state of the art approach of using fixed hours of operation.

The adaptive control method works as described below in a typical photovoltaic powered lighting implementation of the system 50 and uses the following definitions:

C25 Estimated battery 54 capacity at 25 degrees Celsius, measured in amp-hours.

C Estimated battery 54 capacity in amp-hours at the present battery 54 temperature.

h Nominal discharge to charge ratio, a number between 0.0 to 1.0, typically 0.8 to 0.9. In a sense this is a crude measure of battery storage efficiency. For every amp-hour charged into the battery 54, represents how many amp-hours can be discharged from the battery and return to the same SOC as before.

SOC An estimate of the battery 54 state of charge, a number between 0.0 to 1.0. A value of 0.0 for SOC represents a fully discharged battery 54. A value of 1.0 for SOC represents a fully charged battery 54.

H Hours to operate the light (load) each night.

Hs Select switch 181 indicated hours to operate the load each night.

Ht Target hours to operate the light (load) per night if the battery SOC equals 1.0. Ht is initially set to Hs but later adjusted by PSA, see below.

PSA Power source availability, a number ranging from 0.0 to 1.0, which indicates whether or not recent charging activity has been able to reach the charging regulation voltage setpoint for the battery 54. When the battery voltage reaches the regulation voltage setpoint, it is an indicator that the battery 54 is reaching a full state of charge, but is not yet fully charged.

Tb Battery temperature in degrees Celsius as measured by the temperature sensor 98.

CC Charging current of the battery 54 in amps, as measured by the controller 82.

CD Discharge current of the battery 54 in amps, as measured by the controller 82.

ACC Accumulated net charging current of the battery 54 per interval.

ACD Accumulated net discharge current of the battery 54 per interval.

N Number of measurements per interval.

T Time interval in hours.

As described in more detail below, each of these following steps is preferably performed on a continuous basis by the system 50 in the adaptive control method, typically once per second, unless otherwise specified. The computational aspects of the steps are preferably performed by the controller 82.

1. Upon initial power on of the controller 82, the following initial conditions for critical variables are stored in memory in the controller 82:

SOC=0.5

C25=100

Hs=Selected by user with switch 181.
Ht=Hs to set the initial value of Ht
h=0.85
PSA=0.5
T=0.25

2. Measure battery charging current, CC, and discharging current, CD, via signals on the nodes 94 and 97 respectively. Compute the accumulated charging current, ACC, and discharging current, ACD, over a fixed time interval, T, using the following formulas, where N is the total number of measurements per fixed time interval T and typically has a value of 900.

If CC>CD then ACC=ACC+CC−CD and ACD=is not changed, else ACD=ACD+CD−CC and ACC=is not changed.

At the end of each fixed time interval T, perform the following computations in the following order:

Compute battery capacity at the present battery temperature:

$$C=C25*(1+Kc*(Tb-25))$$

Kc is a constant, typically having a value of 0.006. Note that actual battery capacity can be a more complicated function than the linear function shown above. However, this simple formula is adequate for general application. Adjust battery SOC estimate based on accumulated charge current, ACC, and discharge currents, ACD, and estimated battery capacity, C.

$$SOC=SOC+(h*ACC-ACD)* T/(N*C)$$

Prevent the estimate for battery SOC from exceeding 1.0.
If SOC>1.0 then SOC=1.0

3. Once a day, typically when it is time to turn on the lights at sunset, the following step is performed.

Adjust the number of hours to operate the light based upon SOC.

$$H=SOC*Ht$$

Note that this is the key feature of the adaptive control method, to reduce the number of hours of operation of the lighting load as battery SOC drops. In theory, if the controller's estimate of SOC is accurate, the system 50 will never drop to 0.0 SOC, and will operate the light an optimal number of hours per night.

Compute power source availability based upon whether or not the battery charger (i.e., the power source 52) was able to reach the regulation voltage, $V_{reg}$, of the battery 54 or not. If the battery charger reached $V_{reg}$ then PSA=PSA+K1 * (1−PSA) else PSA=PSA+K1 * (0−PSA) where K1 is a constant and would typically have a value of 0.125.

Adjust the target hours of operation, Ht, based upon recent power source availability.

IF PSA>K2 then Ht=Ht+K3 else Ht=Ht−K3

Where K2 is a constant which would typically have a value between 0.0 to 1.0, and is typically having a value of 0.6. K3 is a constant that would typically be 0.1.

Now limit Ht from straying too far from the user specified hours, Hs, of operation from select switch 181.

If Ht>Hs*K4 then Ht=Hs*K4
If Ht<Hs/K4 then Ht=Hs/K4

Where K4 is a constant which would typically have a value of 2.0.

4. During charging, when the battery 54 first reaches the charging regulation setpoint, the value for SOC is set to K9. K9 is a constant, typically having a value of 0.85.

5. If the system reaches LVD, then adjust the estimate of battery capacity, C25, using the following formula.

$$C25=C25 * (1-SOC)$$

Then set SOC=0.0. This formula will generally act to reduce the estimated battery capacity, C25.

6. It is also preferred to have a means to adjust the estimated battery capacity, C25, as follows. (Preferably once per day.)

If PSA>K5 then C25=C25+1
If PSA<K6 then C25=C25−1

K5 is a constant, typically having a value of 0.95. K6 is a constant, typically having a value of 0.20. Since the values of C25 can integrate up or down, the range of adjustment of C25 is preferably bounded as follows.

If C25>K7 then C25=K7
If C25<K8 then C25=K8

K7 is a constant, typically having a value of four-hundred. K8 is a constant, typically having a value of twenty-five. These values are reasonable for a system designed to power lighting loads between thirty-five to one-hundred watts AC.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow.

What is claimed is:

1. An apparatus for supplying energy to a load comprising:

an energy storage devices source;

an energy storage device coupled to said energy source via a first energy converter;

a second energy converter coupled to said energy storage device;

an energy inverter coupled to said second energy converter and the load;

a sensor capable of sensing discharging of said energy storage device; and a controller coupled to said first energy converter, said second energy converter, and said energy inverter, and said energy inverter, and further wherein said controller slows or stops operation of said second energy converter when estimated state of charge in said energy storage device drops below a threshold limit, whereby said controller maintains actual state of charge in said energy storage device within a state of charge range.

2. The apparatus of claim 1, wherein said energy storage device includes a battery.

3. The apparatus of claim 1, wherein said energy storage source includes a capacitor.

4. The apparatus of claim 1, wherein said energy source includes a solar cell.

5. The apparatus of claim 1, wherein said energy source includes a photovoltaic device.

6. The apparatus of claim 1, wherein said energy source includes a wind turbine.

7. The apparatus of claim 1, including a voltage sensor coupled to said energy source.

8. The apparatus of claim 7, including a voltage sensor coupled to said second energy converter.

9. The apparatus of claim 1, including a sensor capable of sensing charging of said energy storage device.

10. The apparatus of claim 9, wherein said sensor is a current sensor.

11. The apparatus of claim 10, wherein said current sensor is coupled between said first energy converter and said energy storage device.

12. The apparatus of claim 1, wherein said sensor is a current sensor.

13. The apparatus of claim 12, wherein said current sensor is coupled between said storage device and said second energy converter.

14. The apparatus of claim 1, wherein said controller provides timing signals to said first energy converter, said second energy converter, and said energy inverter.

15. The apparatus of claim 1, wherein said controller is coupled to said first energy converter and said second energy converter via a gate drive circuit.

16. The apparatus of claim 1, wherein said controller is coupled to said energy inverter via a gate drive circuit.

17. The apparatus of claim 1, wherein said first energy converter includes a DC-to-DC converter.

18. The apparatus of claim 17, wherein said DC-to-DC converter is configured as a buck converter.

19. The apparatus of claim 1, wherein said second energy converter includes a DC-to-DC converter.

20. The apparatus of claim 19, wherein said DC-to-DC converter is configured as a boost converter.

21. The apparatus of claim 1, wherein said energy inverter includes a DC-to-AC converter.

22. The apparatus of claim 1, including a DC current blocker coupled between said energy inverter and the load such that DC current is prevented from injection into the load.

23. The apparatus of claim 1, wherein said second energy converter includes a chargeable energy storage source.

24. The apparatus of claim 23, wherein said chargeable energy storage source includes a capacitor.

25. The apparatus of claim 24, wherein said capacitor is sized large enough such that load currents do not cause said capacitor to overcharge.

26. The apparatus of claim 24, wherein said capacitor is sized small enough such that the capacitor will charge and discharge with inductive load currents.

27. The apparatus of claim 24, wherein said capacitor has a value in a range between 0.1 and 47 microfarads inclusively.

28. The apparatus of claim 22, wherein said DC blocker includes a capacitor.

29. The apparatus of claim 1, wherein said energy inverter supplies a non-sinusoidal AC signal to the load.

30. The apparatus of claim 29, wherein said non-sinusoidal AC signal approximates an alternating square wave.

31. The apparatus of claim 1, wherein the load includes a lighting system.

32. The apparatus of claim 31, wherein said lighting system includes a high intensity discharge lamp.

33. The apparatus of claim 1, wherein said controller slows or stops operation of said second energy converter when discharging of said energy storage source exceeds a threshold rate.

34. The apparatus of claim 23, wherein said chargeable energy storage source is coupled to said energy inverter and reduces surge currents through said energy inverter into the load.

35. The apparatus of claim 24, wherein said capacitor is a polyester film type capacitor.

36. A method for delivering energy to a lighting system susceptible to damage when supplied with DC current, said method comprising:

charging a chargeable energy storage source;

boosting a first voltage signal from said chargeable energy storage source to or above a first voltage level, wherein said first voltage signal is a DC voltage signal and said first voltage level is greater than about 120 volts;

converting said first voltage signal to a second voltage signal having a second voltage level, wherein said second voltage level is less than about said first voltage level and wherein said converting includes blocking DC current in said first voltage signal such that said second voltage signal is substantially only an AC voltage signal; and supplying said second voltage signal to the lighting system.

37. The method of claim 36, wherein said first voltage level is at least 140 volts.

38. The method of claim 36, wherein said second voltage level is approximately 120 volts RMS.

39. The method of claim 36, wherein said lighting system includes a high intensity discharge lamp.

40. A method of delivering energy to a chargeable energy source and a load, comprising:

converting energy received from an energy source into energy receivable by the chargeable energy source;

estimating state of charge of the chargeable energy source, wherein said estimating includes measuring charging current into said chargeable energy source, measuring discharging current from said chargeable energy source, and computing state of charge for the chargeable energy source based upon accumulated charging current, accumulated discharging current, and estimated capacity of said chargeable energy source; and converting energy from the chargeable energy source into energy receivable by the load when said charge level of the chargeable energy source is at or above a threshold charge level;

wherein load operation duration is a function of estimated charge level of said chargeable energy source.

41. The method of claim 40, wherein the chargeable energy source includes a battery.

42. The method of claim 40, wherein the chargeable energy source includes a capacitor.

43. The method of claim 40, wherein the load includes a lighting system.

44. The method of claim 42, wherein said lighting system includes a high intensity discharge lamp.

45. The method of claim 40, wherein said converting of energy from the chargeable energy source into energy receivable by the load includes increasing said energy from the chargeable energy source from a first voltage level to a second voltage level.

46. The method of claim 45, wherein said second voltage level is greater than 120 volts.

47. The method of claim 46, wherein said second voltage level is at least 140 volts.

48. The method of claim 40, wherein said converting of energy from the chargeable energy source into energy receivable by the load includes converting a DC signal into an AC signal.

49. The method of claim 48, wherein said AC signal has a voltage level of approximately 120 volts RMS.

50. The method of claim 48, wherein said AC signal has a frequency of approximately sixty hertz.

51. The method of claim 48, wherein said AC signal is non-sinusoidal.

52. The method of claim 51, wherein said AC signal approximates an alternating square wave.

53. The method of claim 40, including blocking DC current from being injected into the load.

54. The method of claim 40, including reducing surge current from reaching the load.

55. The method of claim 40, wherein said converting of energy from the chargeable energy source into energy receivable by the load includes charging and discharging a capacitor.

56. The method of claim 55, wherein said capacitor is sized large enough such that load currents do not cause said capacitor to overcharge.

57. The method of claim 55, wherein said capacitor is a polyester film type capacitor.

58. The method of claim 36, wherein said AC voltage signal is non-sinusoidal.

59. The method of claim 40, including adjusting said estimated capacity of said chargeable energy source as a function of temperature.

60. The method of claim 40, including adjusting said estimated capacity of said chargeable energy source when charging voltage reaches a constant voltage regulation setpoint.

61. A method for use in operating a chargeable energy source and providing energy to a load to adaptively maintain a state of charge of said chargeable energy source in a high state of charge range, comprising the steps of:

storing initial settings for control variables in memory of a controller, said control variables including an estimated state of charge of said chargeable energy source, a time interval between adjustments of said control variables, a target time period for operating said load based on said chargeable energy source having a maximum state of charge, and a nominal discharge to charge ratio;

operating said controller during said time interval to compute accumulated charging current available for charging said chargeable energy source and accumulated discharging current being discharged from said chargeable energy source;

using said controller to determine an adjusted state of charge based on said estimated state of charge and a product of said nominal discharge to discharge ratio and said accumulated charging current less said accumulated discharging current; and determining with said controller a load operating time period based on a product of said adjusted state of charge and said target operating time period.

62. The method of claim 61, wherein said control variables further include an estimated capacity of said chargeable energy source at a predetermined temperature, and further including the step of setting with said controller a capacity of said chargeable energy source based on a measured temperature of said chargeable energy source, wherein said adjusted state of charge is determined based on said temperature-based capacity.

63. The method of claim 61, further including, prior to said determining step, the steps of computing an availability of a charging power source coupled to said chargeable energy source and adjusting said target operating time based on said charging power source availability.

64. The method of claim 61, wherein said time interval is less than about 1 second.

65. The method of claim 61, further including the steps of measuring load operating time with said controller and providing energy from said chargeable energy source to said load while said measured load operation time is less than said determined load operating time.

66. Apparatus for adaptively controlling charging of a chargeable energy source by an energy source and discharging of energy from said chargeable energy source to provide energy to a load, comprising:

a current sensor for sensing charging current flowing to the chargeable energy source from the energy source;

a current sensor for sensing discharging current flowing from the chargeable energy source to the load; and a programmable controller coupled to said current sensors for receiving signals corresponding to said sensed charging and discharging of the chargeable energy source from said sensors, wherein said programmable controller is programmed to:

compute accumulated charging current and accumulated discharging current from said signals received during a predetermined time interval;

determine an adjusted state of charge based on a preset state of charge and a product of a nominal discharge to charge ratio for the chargeable energy source and said accumulated charging current less said accumulated discharging current;

determine a load operating time period based on a product of said adjusted state of charge and a target time period for operating the load preset based on the chargeable energy source having a maximum state of charge; and operate the load by discharging current from the chargeable energy source for said load operating time.

67. The apparatus of claim 66, further including a temperature sensor coupled between said controller and the rechargeable energy source for sensing temperature of the rechargeable energy source, and wherein said controller further programmed to determined said adjusted state of charge based on said temperature of said rechargeable energy source sensed by said temperature sensor.

* * * * *